US012667156B2

(12) United States Patent (10) Patent No.: US 12,667,156 B2
Teetzel et al. (45) **Date of Patent: *Jun. 30, 2026**

(54) RECLINING HELMET MOUNT APPARATUS

(71) Applicant: WILCOX INDUSTRIES CORP., Newington, NH (US)

(72) Inventors: James W. Teetzel, Portsmouth, NH (US); Gary M. Lemire, Lee, NH (US); Patrick K. Graham, Kittery, ME (US)

(73) Assignee: Wilcox Industries Corp., Newington, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/655,249

(22) Filed: May 4, 2024

(65) Prior Publication Data

US 2024/0365913 A1 Nov. 7, 2024

Related U.S. Application Data

(63) Continuation-in-part of application No. 18/655,175, filed on May 3, 2024, now Pat. No. 12,389,972.

(60) Provisional application No. 63/464,256, filed on May 5, 2023.

(51) Int. Cl.
*A42B 3/32* (2006.01)
*G02B 27/01* (2006.01)

(52) U.S. Cl.
CPC .......... *A42B 3/324* (2013.01); *G02B 27/0149* (2013.01)

(58) Field of Classification Search
CPC ............ A42B 3/04; A42B 3/042; A42B 3/324
USPC ........................................................ 2/422
See application file for complete search history.

(56) References Cited

U.S. PATENT DOCUMENTS

| | | | |
|---|---|---|---|
| 4,449,787 A | 5/1984 | Burbo et al. | |
| 5,416,922 A | 5/1995 | Horvat et al. | |
| 5,506,730 A | 4/1996 | Morley et al. | |
| 6,125,477 A | 10/2000 | Crippa et al. | |
| 7,219,370 B1 | 5/2007 | Teetzel et al. | |
| 8,739,313 B2 * | 6/2014 | Teetzel ................. | G02B 23/125 2/6.6 |
| 11,627,774 B2 * | 4/2023 | Meney .................... | F16M 13/04 248/187.1 |
| 2008/0263752 A1 * | 10/2008 | Solinsky ................ | A42B 3/042 2/422 |
| 2012/0244120 A1 * | 9/2012 | Charron ............. | A61K 31/4439 424/85.4 |
| 2014/0082810 A1 * | 3/2014 | Daniels .................. | A61F 9/067 2/8.2 |
| 2014/0259318 A1 * | 9/2014 | Daniels .................. | A42B 3/225 2/424 |

(Continued)

OTHER PUBLICATIONS

International Search Report and Written Opinion in Application No. PCT/US2024/027894 dated Aug. 8, 2024.

*Primary Examiner* — Timothy K Trieu
(74) *Attorney, Agent, or Firm* — McLane Middleton, Professional Association

(57) ABSTRACT

A helmet mount apparatus for adjusting the position of a viewing device on a helmet includes a track assembly removably attachable to the helmet and a main carriage assembly slidably attached to and movable along the track assembly. A vertical adjustment assembly is pivotally coupled to the main carriage assembly and an axial sliding assembly is coupled to the vertical adjustment assembly, wherein the vertical adjustment subassembly is configured to detachably couple to the viewing device.

19 Claims, 35 Drawing Sheets

(56)  References Cited

U.S. PATENT DOCUMENTS

| | | | | |
|---|---|---|---|---|
| 2014/0373423 | A1 | | 12/2014 | Teetzel et al. |
| 2018/0231404 | A1* | 8/2018 | Kitain | .................... A42B 3/042 |
| 2021/0030098 | A1* | 2/2021 | O'Connell | ............ A42B 3/042 |
| 2022/0071336 | A1* | 3/2022 | Franzino | ................. A42B 3/04 |
| 2024/0365912 | A1 | | 11/2024 | Teetzel et al. |

* cited by examiner

1ST ACTION: ROTATE HUD TO LIMITER TO
CLEAR HELMET BRIM (APPROXIMATELY 15°)

PARALLEL TO HORIZON – DEPLOYED POSITION

3RD ACTION: SLIDE CARRIAGE UP AND BACK TO
ENGAGE UPPER CARRIAGE LOCK – STOWED POSITION

2ND ACTION: PUSH TO UNLOCK CARRIAGE FROM
TRACK LOCK GROOVE (APPROXIMATELY 5°)

1ST ACTION: ROTATE TO LIMITER TO
CLEAR HELMET BRIM (APPROXIMATELY 15°)
(HUD REMOVED FOR CLARITY)

PARALLEL TO HORIZON – DEPLOYED POSITION
(HUD REMOVED FOR CLARITY)

3RD ACTION: SLIDE CARRIAGE UP AND BACK TO
ENGAGE UPPER CARRIAGE LOCK - STOWED POSITION
(HUD REMOVED FOR CLARITY)

2ND ACTION: PUSH TO UNLOCK CARRIAGE FROM
TRACK LOCK GROOVE (APPROXIMATELY 5°)
(HUD REMOVED FOR CLARITY)

130

320

130a

602

110

594

592

604

RECLINING HELMET MOUNT APPARATUS

CROSS REFERENCE TO RELATED APPLICATION

This application is a continuation-in-part of U.S. nonprovisional application Ser. No. 18/655,175 filed May 3, 2024, which in turn claims the priority benefit of U.S. provisional application No. 63/464,256 filed May 5, 2023. Each of the aforementioned applications is incorporated herein by reference in its entirety.

INCORPORATION BY REFERENCE

This application is related to commonly owned U.S. Pat. No. 7,219,370 entitled "Helmet Mounting Systems" and U.S. Pat. No. 9,775,395 entitled "Headgear Shroud Assembly". Each of the aforementioned patents is incorporated herein by reference in its entirety.

BACKGROUND

The present disclosure relates to a helmet mount assembly and, in particular, to a reclining mount for alternately positioning a helmet mounted display which is mounted to a helmet or similar headgear between a viewable position and a stowed position. The present disclosure contemplates a new and improved helmet mount apparatus and method. The helmet mount apparatus is suited for mounting a display device such as a virtual reality (VR) display, augmented reality (AR) display, head up display (HUD), or other near eye display, although it is also amenable to mounting other viewing devices, including optical and electro-optical devices, including without limitation binoculars, night vision devices, electronic night vision devices, cameras such as thermal cameras, short wave infrared (SWIR) cameras, visors, face shields, optical filters and attenuators, and others.

SUMMARY

In one aspect, a helmet mount apparatus is provided for adjusting the position of a viewing device on a helmet. The helmet mount apparatus includes a track assembly removably attachable to the helmet. A main carriage assembly is slidably attached to and movable along the track assembly. A vertical adjustment assembly is pivotally coupled to the main carriage assembly. An axial sliding assembly is coupled to the vertical adjustment assembly, wherein the vertical adjustment subassembly is configured to detachably couple to the viewing device.

In a more limited aspect, the viewing device is a head up display.

In another a more limited aspect, the vertical adjustment assembly includes a pivot plate pivotally coupled to a sliding carriage member of the main carriage assembly. A gear rack affixed to the pivot plate, wherein the gear rack includes a plurality of teeth. A vertical adjustment slide carriage slidably is coupled to the gear rack and includes a slide lock configured to selectively engage with the gear rack at a plurality of positions to prevent sliding movement of the vertical adjustment slide carriage with respect to the gear rack. A release member is coupled to the slide lock and manually actuatable to disengage the slide lock from the plurality of teeth to permit sliding movement of the vertical adjustment slide carriage with respect to the gear rack.

In another a more limited aspect, the axial sliding assembly includes a slide rail member having a proximal end secured to the vertical adjustment slide carriage assembly. An axial slide carriage slidably is coupled to the slide rail member and configured to detachably couple to the viewing device, the axial slide carriage slidable in an axial direction along the slide rail member for adjusting a distance between the viewing device and a user's eyes.

In another a more limited aspect, the main carriage assembly includes a sliding carriage slidably engaging the track assembly and a main slide lock assembly disposed on the sliding carriage. The main slide lock assembly includes a slide lock member disposed within a slide lock housing, the slide lock member passing through an opening in the sliding carriage and extending into an axially-extending elongate opening formed in a base of the track assembly. The elongate opening has an axially-extending series of track teeth, the slide lock member configured to releasably engage with the track teeth to prevent sliding movement of the sliding carriage with respect to the track assembly.

In another a more limited aspect, the helmet mount apparatus further includes a slide lock release button carried on the main slide lock assembly, the slide lock release button coupled to the slide lock member, wherein the slide lock release button is manually actuatable to move the slide lock member out of engagement with the track teeth.

In another a more limited aspect, the track base is bounded on opposing sides by axially-extending sidewalls and a resilient detent member is coupled to the slide lock release button and is configured to engage a complementary detent recess formed on a first one of the sidewalls when (a) the slide lock release button is manually actuated, and (b) the resilient detent member is moved into axial alignment with the detent recess, the detent recess thereby defining a preferential stopping position of the sliding carriage.

In another a more limited aspect, the resilient detent member is moved into engagement with the first one of the sidewalls when the slide lock release button is manually actuated and moved out of engagement with the first one of the sidewalls when the slide lock release button is not manually actuated.

In another a more limited aspect, the resilient detent member is configured to disengage from the detent recess upon application of a threshold force to thereby enable positional adjustment of the sliding carriage along the track assembly.

In another a more limited aspect, the first one of the sidewalls includes a notch configured to receive a detent plate having the detent recess formed thereon.

In another a more limited aspect, the notch is configured to receive a plurality of detent plates, wherein each of the interchangeable detent plates has a detent recess formed at a different axial position, and further wherein the detent plates are interchangeable to allow customization of the preferential stopping position.

In another a more limited aspect, the track base is bounded on opposing sides by axially-extending sidewalls, wherein each of the axially-extending sidewalls includes an axially-extending channel formed therein, and wherein the sliding carriage includes one or more pairs of tabs extending outward from opposing sides thereof and each tab of the one or more pairs of tabs slidably received within one of the axially-extending channels.

In another a more limited aspect, the track assembly has a curved configuration conforming in curvature to a front surface of the helmet.

In another a more limited aspect, the axial sliding assembly includes a slide rail member having a proximal end secured to the vertical adjustment assembly and an axial slide carriage slidably coupled to the slide rail member and configured to detachably couple to the viewing device. The axial slide carriage is slidable in an axial direction along the slide rail member for adjusting a distance between the viewing device and a user's eyes.

In another a more limited aspect, the axial sliding assembly includes a mounting shoe interface plate disposed on a first side of the slide rail member and defining a mounting shoe receptacle configured to detachably couple to a mounting shoe on the viewing device. A housing is disposed on a second side of the slide rail member and coupled to the mounting shoe interface plate. One or more manually actuatable slide release buttons have one or more locking teeth configured to interlock with an axially-extending series of teeth disposed on the slide rail member to secure the axial sliding assembly in a fixed axial position with respect to the slide rail member. The one or more manually actuatable slide release buttons are configured to move the one or more locking teeth out of engagement with the axially-extending series of teeth to permit axial sliding movement of the axial sliding assembly with respect to the slide rail member. A pivoting lock lever is pivotally secured to the axial sliding assembly and includes a latch member extending through an opening in the mounting shoe interface plate and configured to engage with a complementary opening in the mounting shoe when the viewing device is coupled to the axial sliding assembly. A spring member is coupled to the latch member and configured to pivot the pivoting lock lever in a first direction wherein the latch member is urged onto engagement with the complementary opening in the mounting shoe. A lock lever release button is mechanically coupled to the pivoting lock lever and configured to pivot the pivot the pivoting lock lever in a second direction opposite the first direction to move the latch member onto engagement with the complementary opening in the mounting shoe.

In another a more limited aspect, the main carriage assembly includes a sliding carriage having a sliding plate and first and second arms extending from a lower end of the sliding plate, each of the first and second arms including an aligned opening positioned along a pivot axis. The vertical adjustment assembly includes a pivot plate having a pivot cylinder disposed at a lower end of the pivot plate, the pivot cylinder disposed between the first and second arms, the pivot cylinder including a bore aligned with the pivot axis. A pivot rod passes through the aligned holes of the first and second arms and the bore of the pivot cylinder, wherein the pivot rod rotatably couples the sliding carriage to the pivot plate, thereby facilitating pivoting movement between the main carriage assembly and the vertical adjustment assembly.

In another a more limited aspect, the helmet mount apparatus further includes one or more tensioning members configured to create adjustable resistance to the pivoting movement.

In another a more limited aspect, the helmet mount apparatus further includes a shroud interface assembly coupled to the track assembly, the shroud interface assembly configured to mechanically couple to a shroud on the helmet.

Various advantages and benefits of the present development will become apparent to those skilled in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Detailed embodiments of the present development are disclosed herein; however, it is to be understood that the disclosed embodiments are merely exemplary of the invention, which may be embodied in various forms. Therefore, specific structural and functional details disclosed herein are not to be interpreted as limiting but merely as a basis for the claims and as a representative basis for teaching one skilled in the art to variously employ the present inventive concept in virtually any appropriately detailed structure. Further, the terms and phrases used herein are not intended to be limiting but rather to provide an understandable description of the present development.

The terms "a" or "an," as used herein, are defined as one or more than one. The term "another," as used herein, is defined as at least a second or more. The terms "including" and/or "having" as used herein, are defined as comprising (i.e., open transition). The term "coupled" or "operatively coupled," as used herein, is defined as indirectly or directly connected.

As used in this application, the terms "front," "rear," "upper," "lower," "upwardly," "downwardly," "left," "right," and other orientation descriptors are intended to facilitate the description of the exemplary embodiment(s) of the present invention in relation to the provided figures, and are not intended to limit the structure thereof to any particular position or orientation.

As used herein, the term "shroud" refers to a component attached to the frontal portion of a helmet which is designed to serve as a mounting fixture or interfacing platform for facilitating attachment of helmet-mounted devices.

FIGS. 1-11B illustrate a first embodiment of the reclining helmet mount assembly 100 of the present invention. FIGS. 12-21B illustrate a second embodiment of the reclining helmet mount assembly 100a of the present invention.

Figure 1:
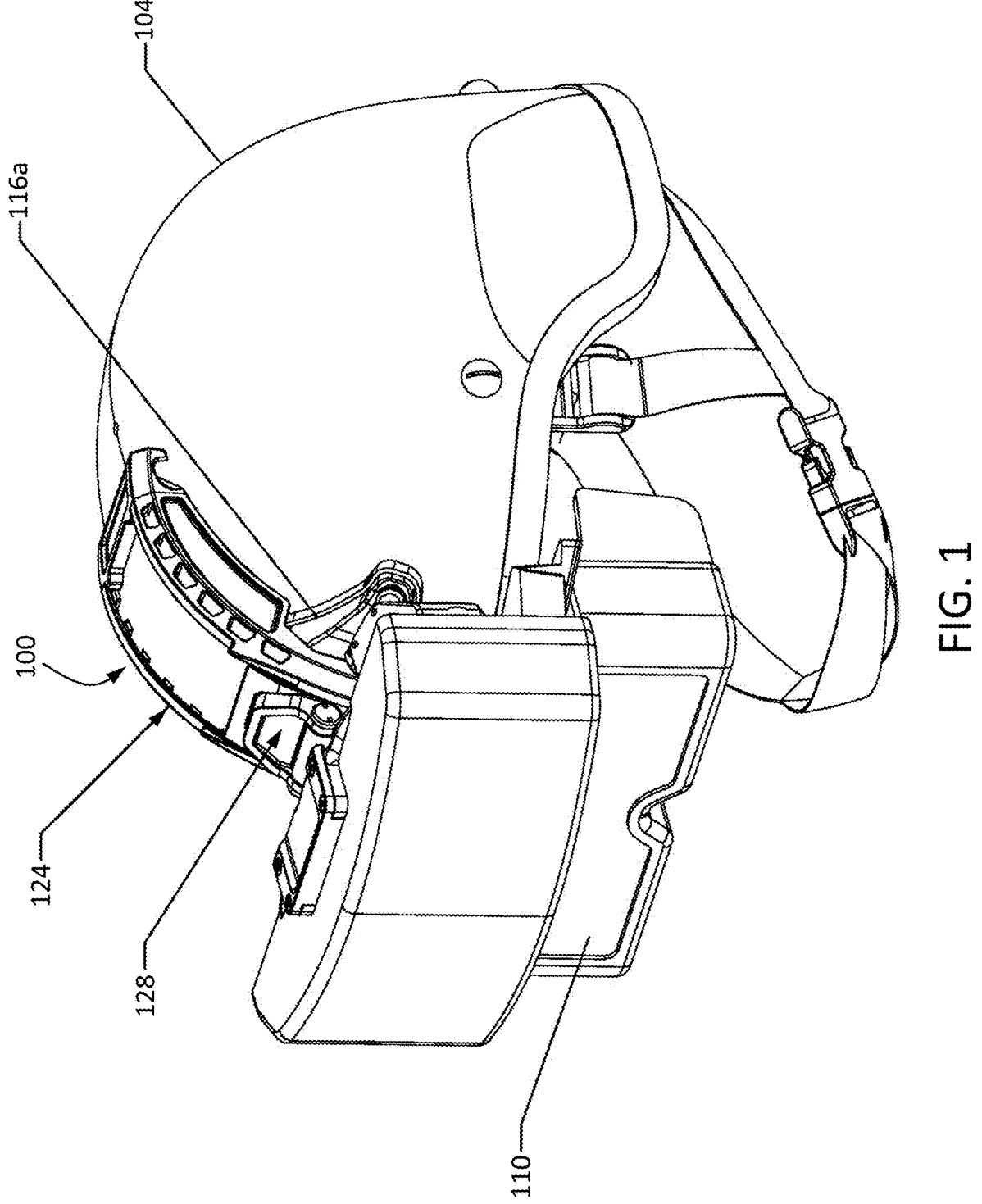
FIG. 1 is an isometric view of a helmet employing a first embodiment of the reclining helmet mount apparatus in conjunction with a first shroud.

Referring now to FIG. 1 there is shown a reclining helmet mount assembly 100 attached to a helmet 104 for supporting a viewing device 110 in front of the eyes of a user. The viewing device 110 may be a near eye display, virtual reality display, augmented reality display, mixed reality display, holographic display, head up display, or the like.

The helmet mount assembly 100 includes a shroud interface assembly 108 configured for detachably securing to a front shroud 116a, 116b of a helmet. In embodiments, the shroud is a legacy shroud 116a configured to receive a G22 or G24 series shroud available from Wilcox Industries Corp. of Newington, NH. Such shrouds include, for example, shrouds in the L4 series from Wilcox Industries Corp., including without limitation the Wilcox L4 one hole shroud for helmets having a single hole pattern and the Wilcox LA three hole shroud for helmets having a three hole pattern.

Figure 2:
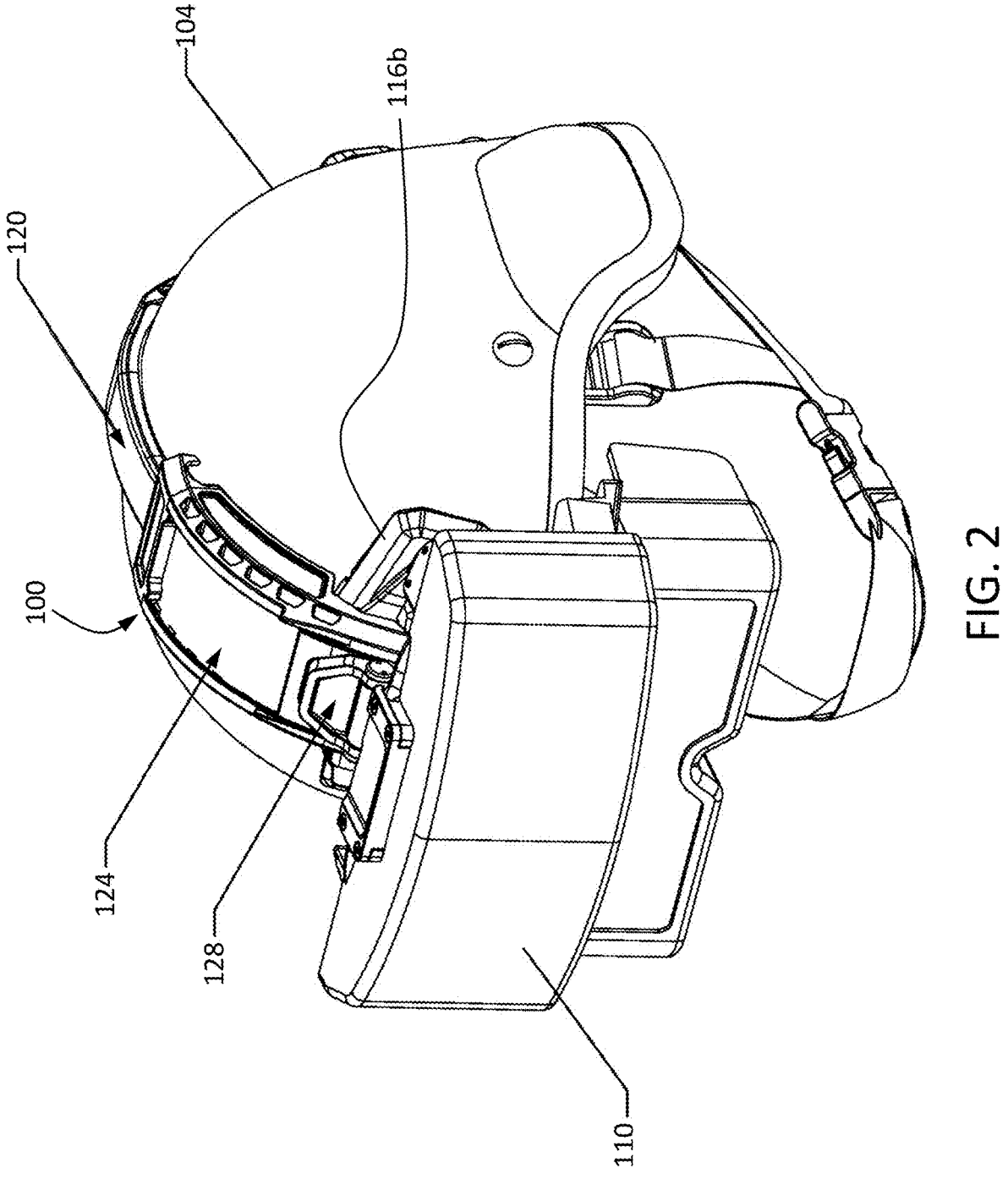
FIG. 2 is an isometric view of a helmet employing the first embodiment of the reclining helmet mount apparatus in conjunction with a second shroud and attachment system.

Referring now to FIG. 2, the front shroud may be a shroud 116b associated with the Wilcox Industries Corp. Universal Helmet Mount Assembly or CLAW helmet attachment system 120.

The helmet mount assembly 100 includes a helmet track subassembly 124 and a sliding carriage subassembly 128 slidably attached thereto. A vertical adjustment subassembly 130 is pivotably coupled to the sliding carriage subassembly 128. The vertical adjustment subassembly 130 in turn is secured to the viewing device 110.

Figure 3B:
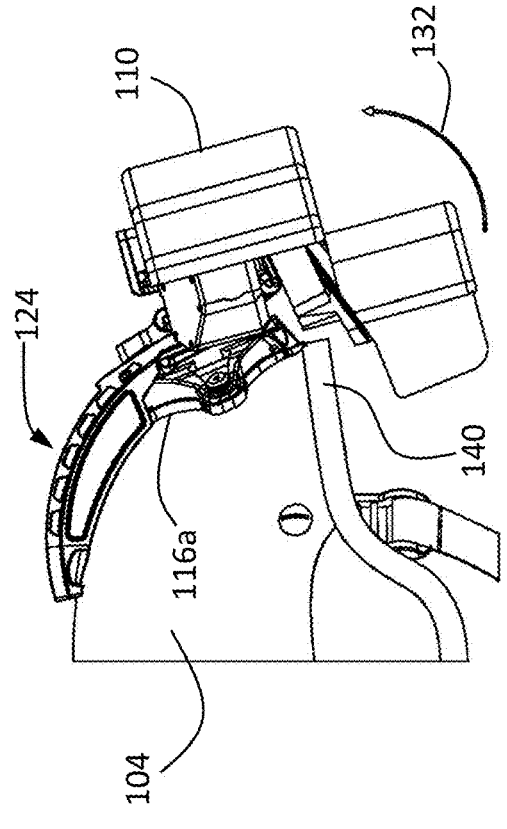
FIGS. 3A-3D are sequential side views illustrating the transition of the viewing device from the deployed position to the stowed position.
Figure 3A:
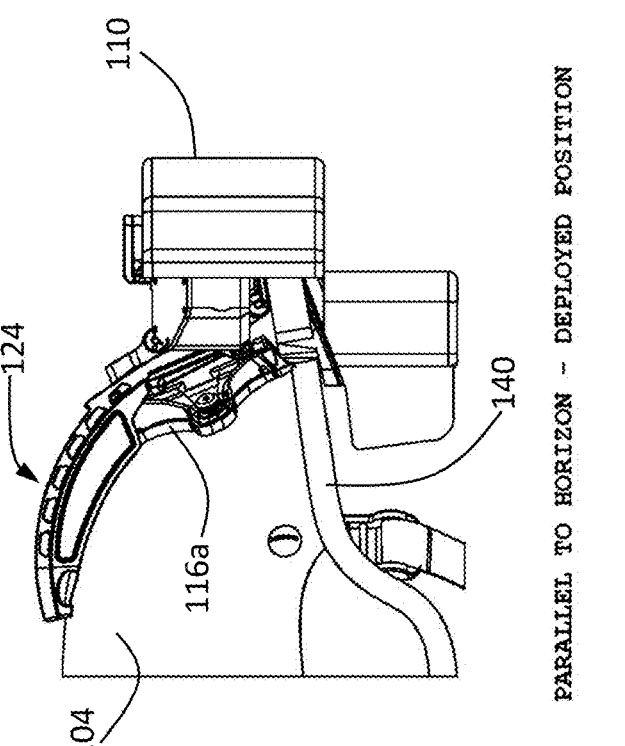

Referring now to FIGS. 3A-3D and 4A-4D, there is illustrated the manner of moving the viewing device 110 from the deployed or operable position to a stowed position. In FIG. 3A, the viewing device is in the deployed position wherein the viewing device 110 is parallel to the horizon or user's line of sight. To move the viewing device 110 to the stowed position, the user first rotates the viewing device 110 as indicated by the arrow 132 in FIG. 3B. The tilt limiting stop flats 136 (see FIG. 8B) in the sliding carriage subassembly 128 limit the range of rotation to an extent sufficient to allow the viewing device 110 to clear the brim 140 of the helmet 104. In embodiments, the angle of rotation is about 15 degrees.

Figure 3D:
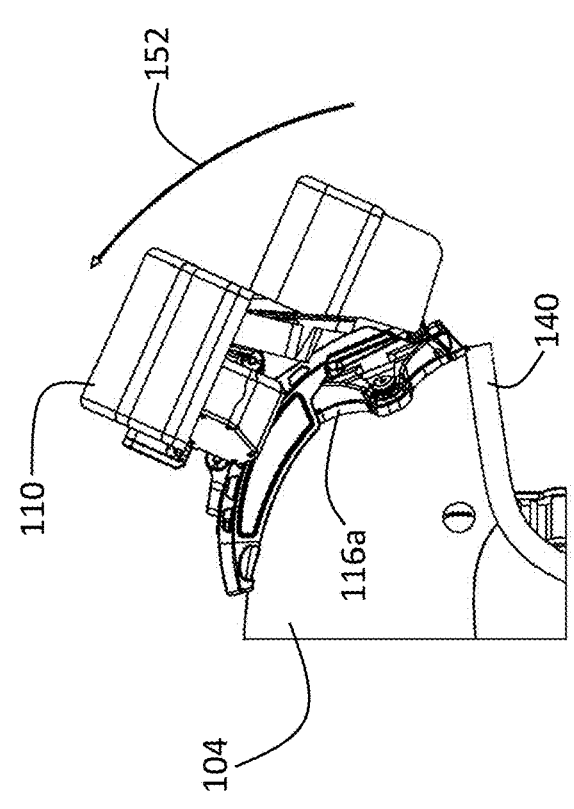
Figure 3C:
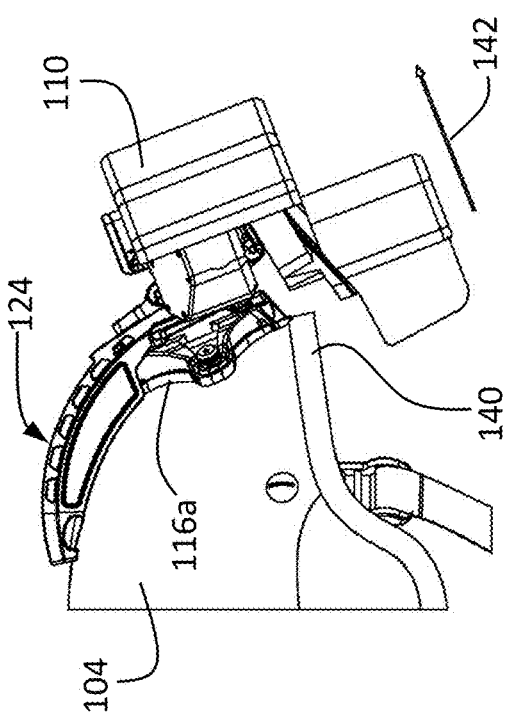
Figure 4B:
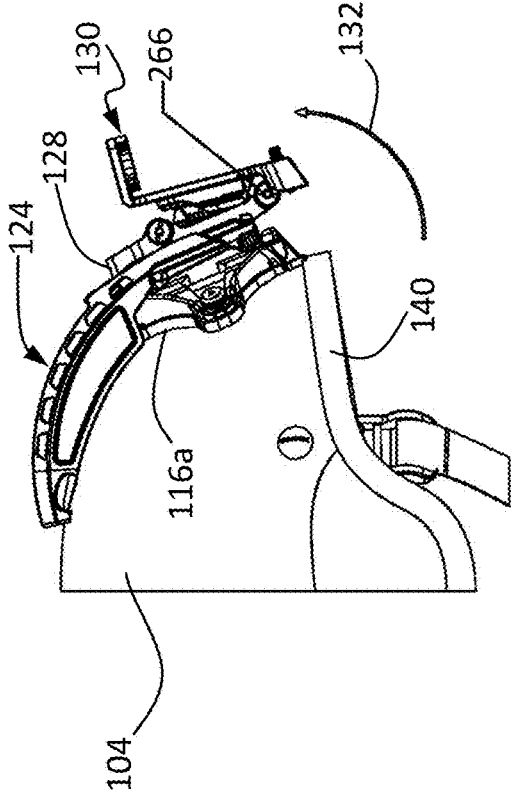
FIGS. 4A-4D are sequential side views illustrating the transition of the vertical adjustment subassembly from the deployed position to the stowed position.
Figure 4A:
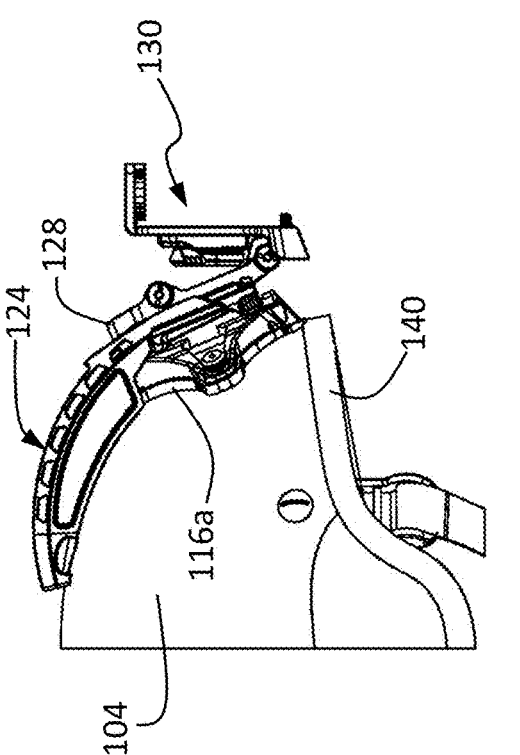
Figures 4C, 4D:
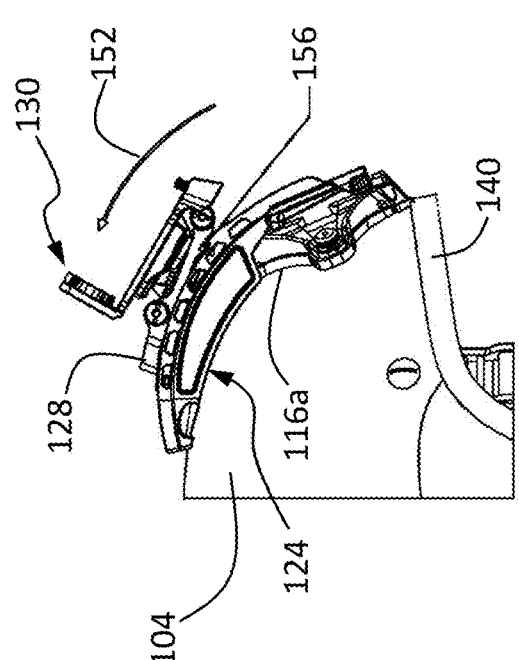

Next, the viewing device 110 is pushed outward, away from the track subassembly 124 as indicated by the arrow 142 in FIG. 3C. This causes a locking tongue 144 (see FIG. 10B) on the sliding carriage subassembly 128 to disengage from a complementary locking groove 148 (see FIG. 6) on the track subassembly 124.

Next, the sliding carriage subassembly 128 is slid upward with respect to the helmet track subassembly 124 as indicated by the arrow 152 in FIG. 3D. The sliding carriage subassembly 128 is slid upward along a track 150 until locking tab 156 (see FIG. 5) on opposing sides of the sliding carriage subassembly 128 move past shoulders 158 on opposing sides of the track 150 to secure the viewing device 110 in the stowed position. To return the viewing the viewing device 110 to the deployed position, the viewing device 110 is lifted away from the track 150 until the locking tabs 156 clear the shoulders 158 and the process as described above is reversed.

Figure 5:
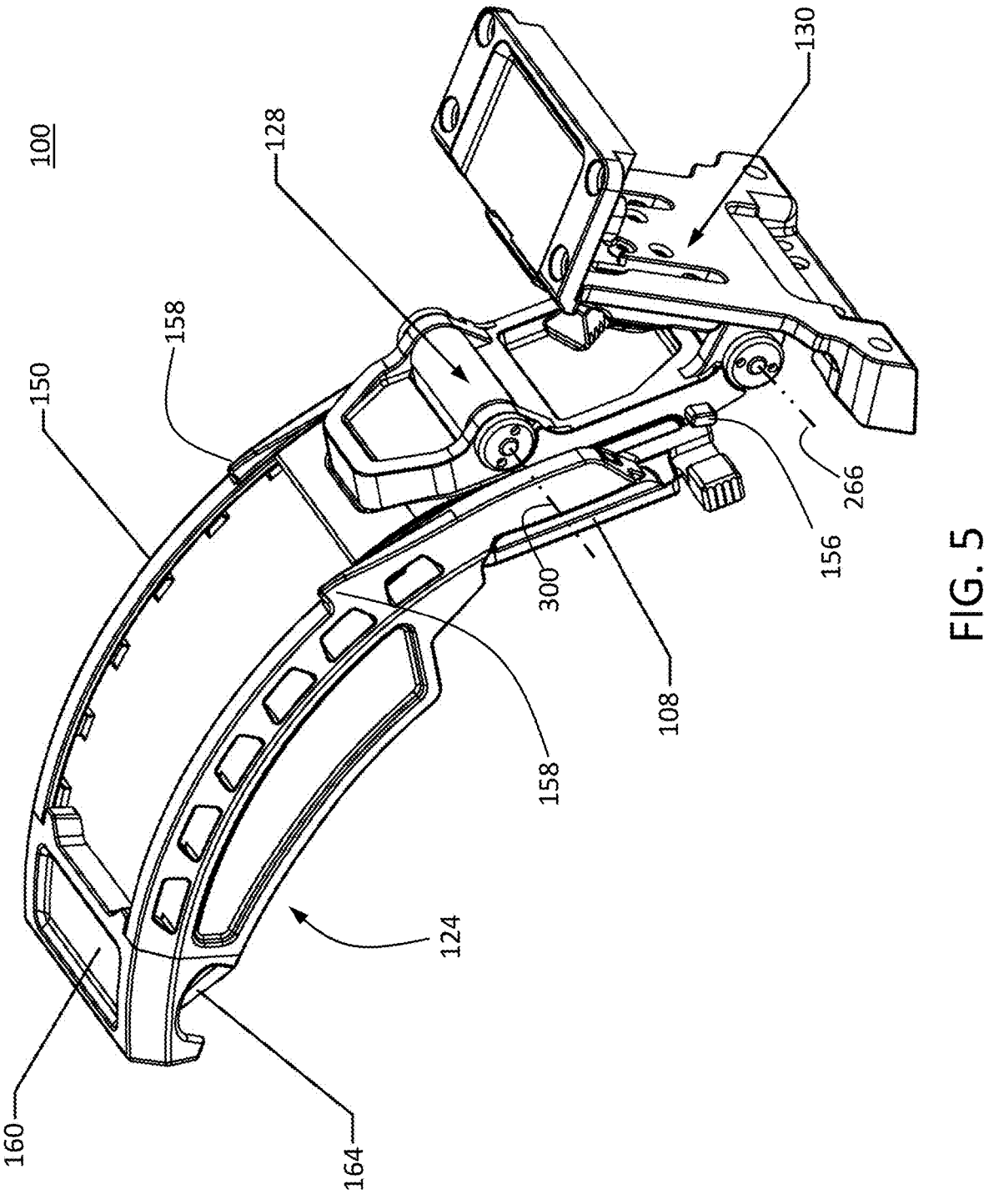
FIG. 5 is an enlarged isometric view of the recliner apparatus.
Figure 6:
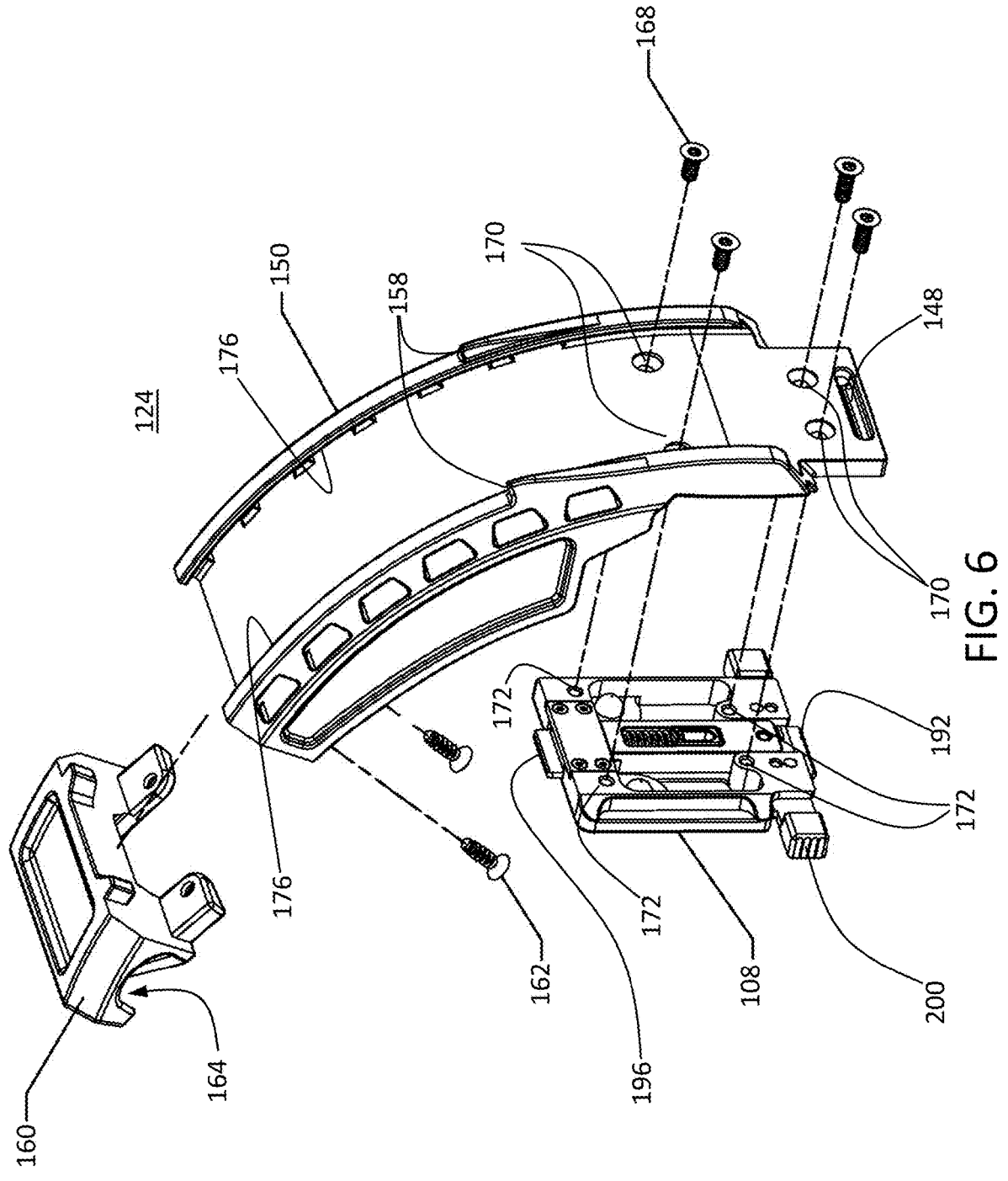
FIG. 6 is an exploded isometric view of the recliner apparatus.

Referring now to FIGS. 5 and 6, the track subassembly 124 includes the track 150. A track stop 160 is secured to the track 150 with threaded fasteners 162 and is disposed at the distal end of the track 150 to limit sliding movement of the sliding carriage subassembly 128 there past. In embodiments, cable management apertures or channels 164 are provided in the track subassembly 124. Threaded fasteners 168 pass through clearance opening 170 at the proximal end of the track 150 and engage tapped openings 172 in the helmet shroud interface subassembly 108 to secure the shroud interface assembly 108 to the track 150.

The track 150 includes opposing channels or grooves 176 which run parallel to each other and are spaced apart by a distance configured to accommodate a sliding plate member 180 of the sliding carriage subassembly 128. Sliding tongues 184 on the sliding plate member 180 are slidably received in the respective grooves 176.

Figure 7A:
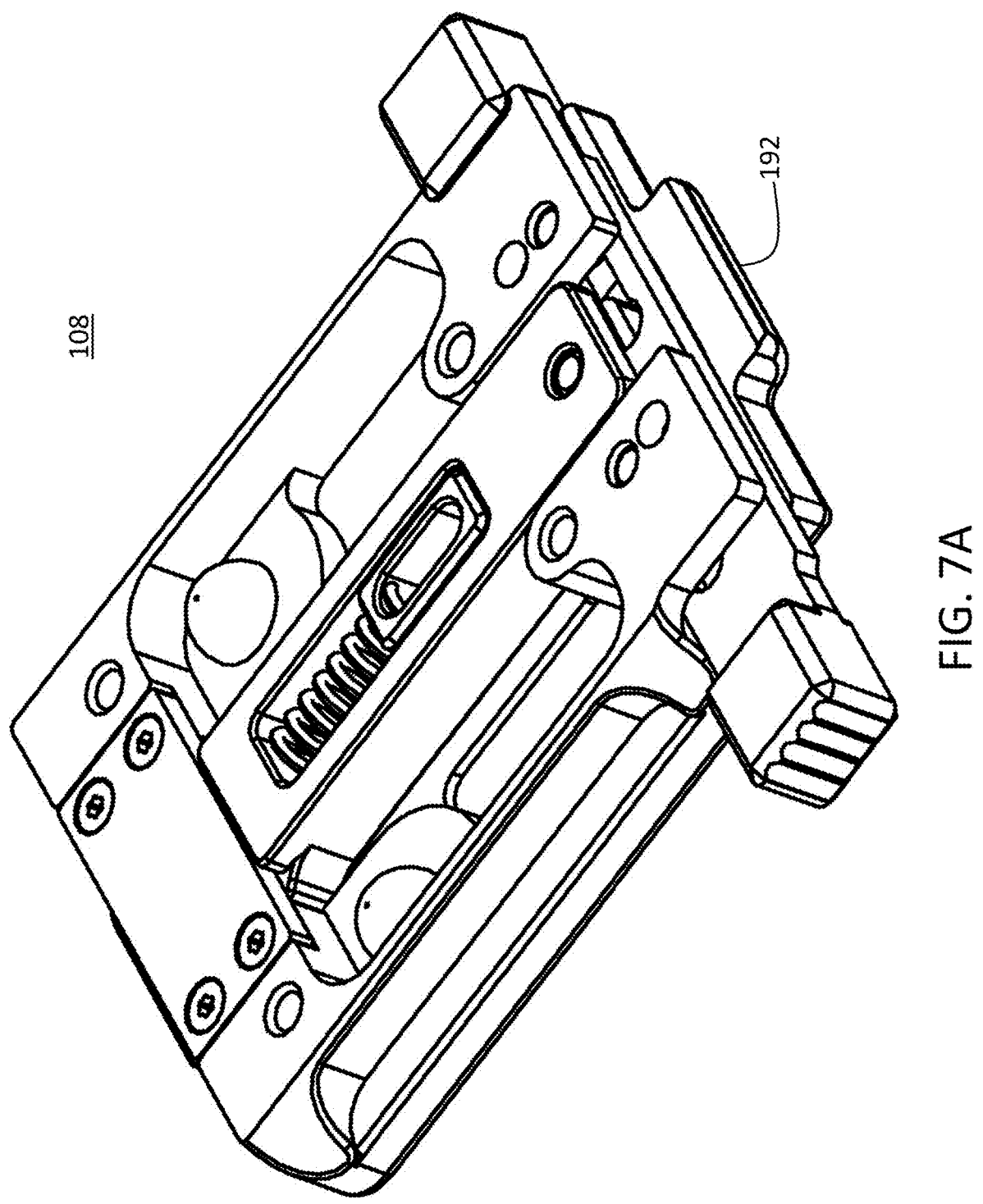
FIG. 7A is an isometric view of an interface assembly for detachably coupling the helmet track assembly to the front shroud of a helmet.
Figure 7B:
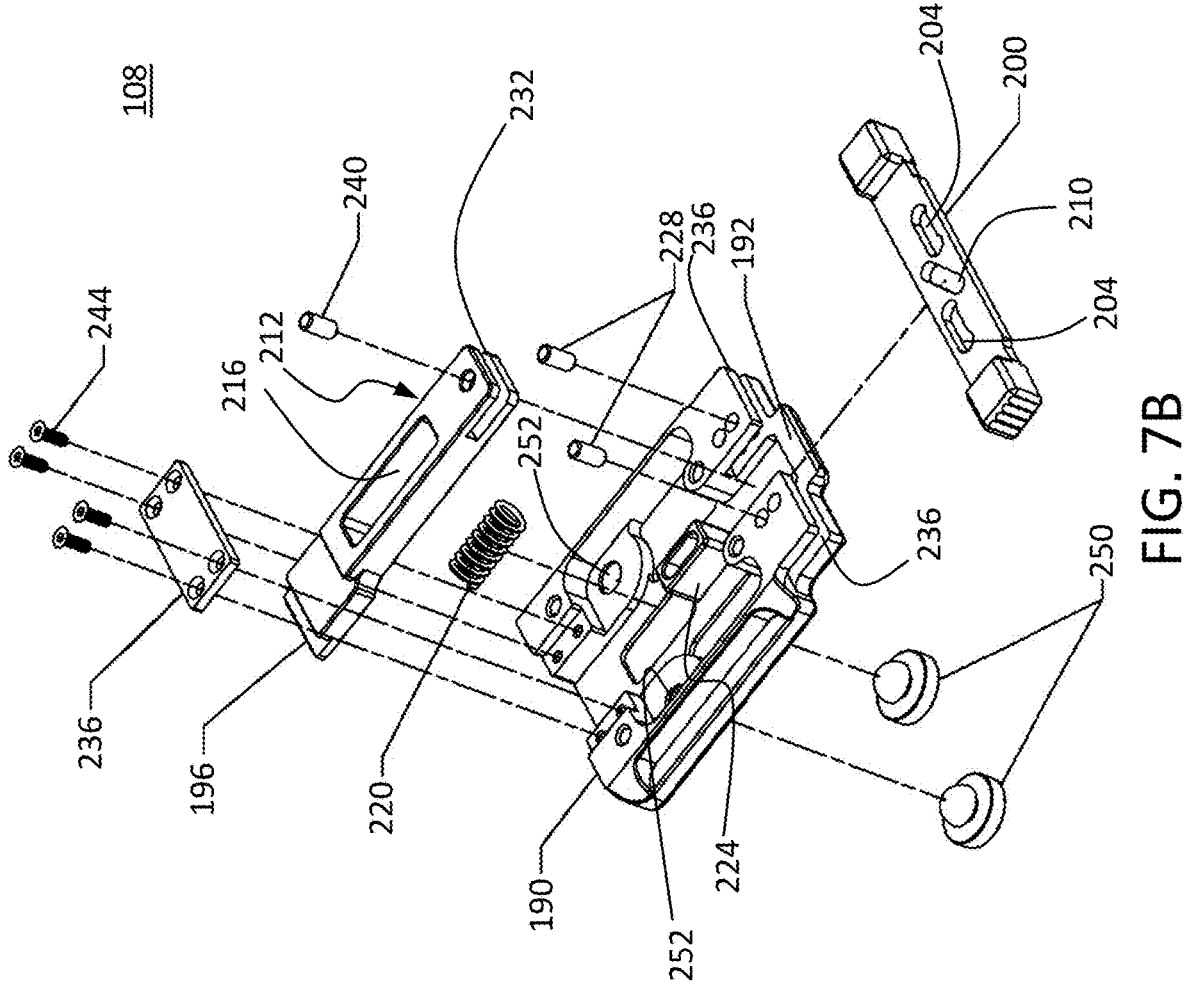
FIG. 7B is an exploded isometric view of the interface assembly appearing in FIG. 7A.

Referring now to FIGS. 7A and 7B, the shroud interface subassembly 108 includes a base plate 190. A fixed locking tongue 192 is disposed on a lower end of the base plate 190 and is configured to be received in a corresponding lower interface groove (not shown) on the shroud 116*a*, 116*b*. A movable locking tongue 196 is disposed at a distal end of a carrier 212. The movable locking tongue is positioned at an upper end of the base plate 190 and is configured to be received in a corresponding upper interface groove (not shown) on the shroud 116*a*, 116*b*.

The carrier 212 includes an elongate opening receiving a tensioning spring 220. One end of the spring 220 bears against a spring boss 224 on the base plate 190 and urges or biases the carrier 212 and locking tongue 196 upward. The proximal end of the carrier 212 includes a slot 232. The lower end of the base plate 190 includes slots 236 adjacent and aligned with the slot 232.

An actuator bar 200 is transversely slidably received within the slots 232, 236. The extent of sliding movement of the actuator bar 200 with respect to the base plate 190 is constrained by guide pins 228 passing through the channels 236 and riding in elongate slots 204 in the actuator bar 200. Movement of the actuator bar 200 in relation to the carrier 212 is constrained by an actuator pin 240 passing through the channel 232 and an elongate opening 210 in the actuator bar 210. The elongate opening 210 is angled relative to the horizontal or transverse direction such that transverse sliding movement of the actuator bar 200 causes up and down movement of the carrier 212. The spring 220 biases the carrier so that it is retained in the upper position such that the upper tongue 196 is extended. In order to retract the tongue 196, i.e., for the purpose of attaching or removing the interface assembly 108 to the shroud 116*a*, 116*b*, the actuator bar 200 is manually moved by the user against the bias of the spring 200. In embodiments, dampening members such as grommets 250 are received in openings 252 in the base plate 190 to decrease noise or vibration between the shroud interface assembly 108 and the shroud 116*a*, 116*b*. In embodiments, the shroud interface subassembly 108 operates in a manner similar to the interface assembly as shown and described in commonly owned U.S. Pat. No. 8,739,313, albeit inverted, with respect to the shroud interface subassembly 108. U.S. Pat. No. 8,739,313 is incorporated herein by reference in its entirety.

Figure 8A:
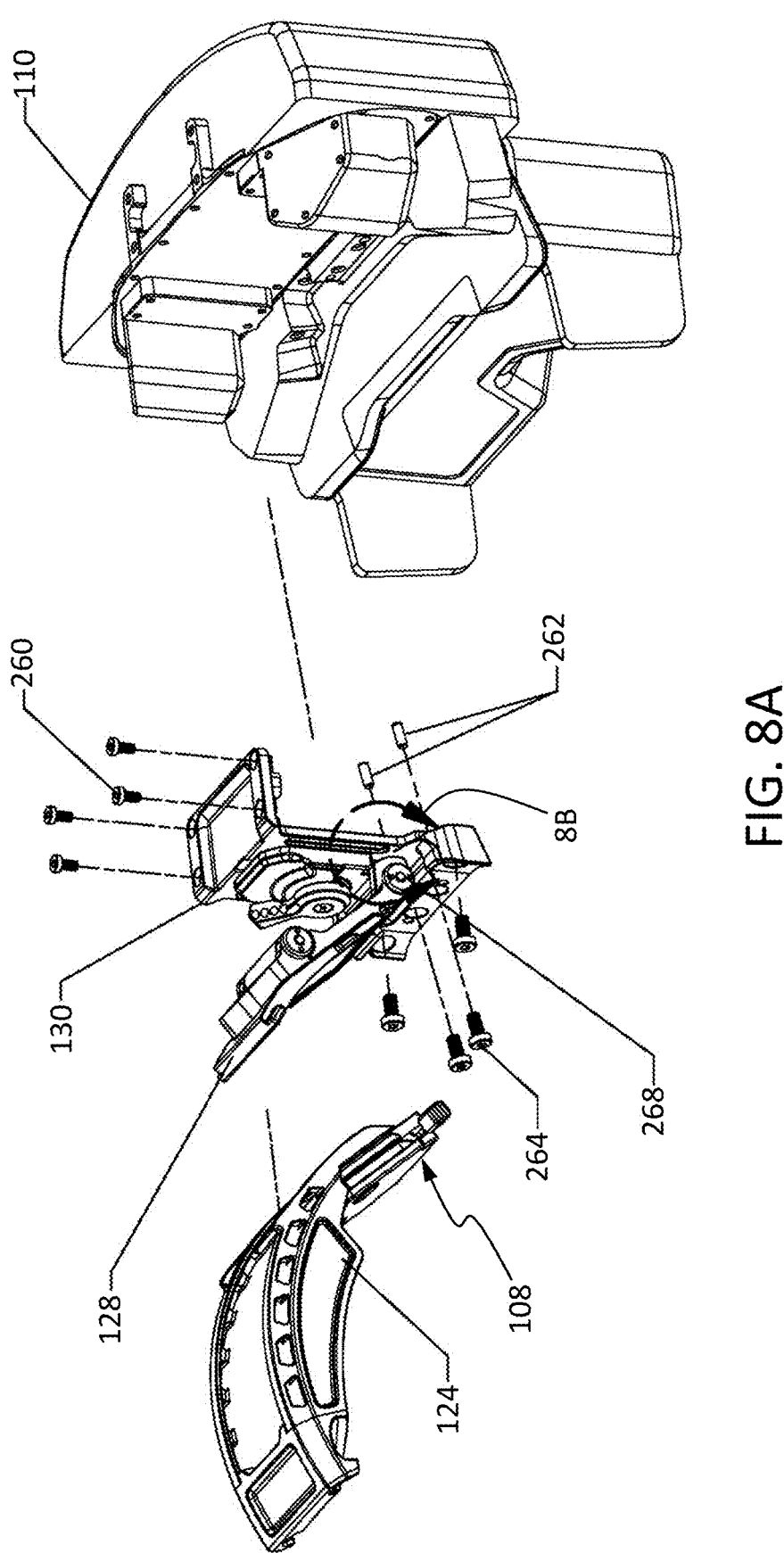
FIG. 8A is an isometric view of the track assembly, viewing device interface assembly and viewing device.
Figure 8B:
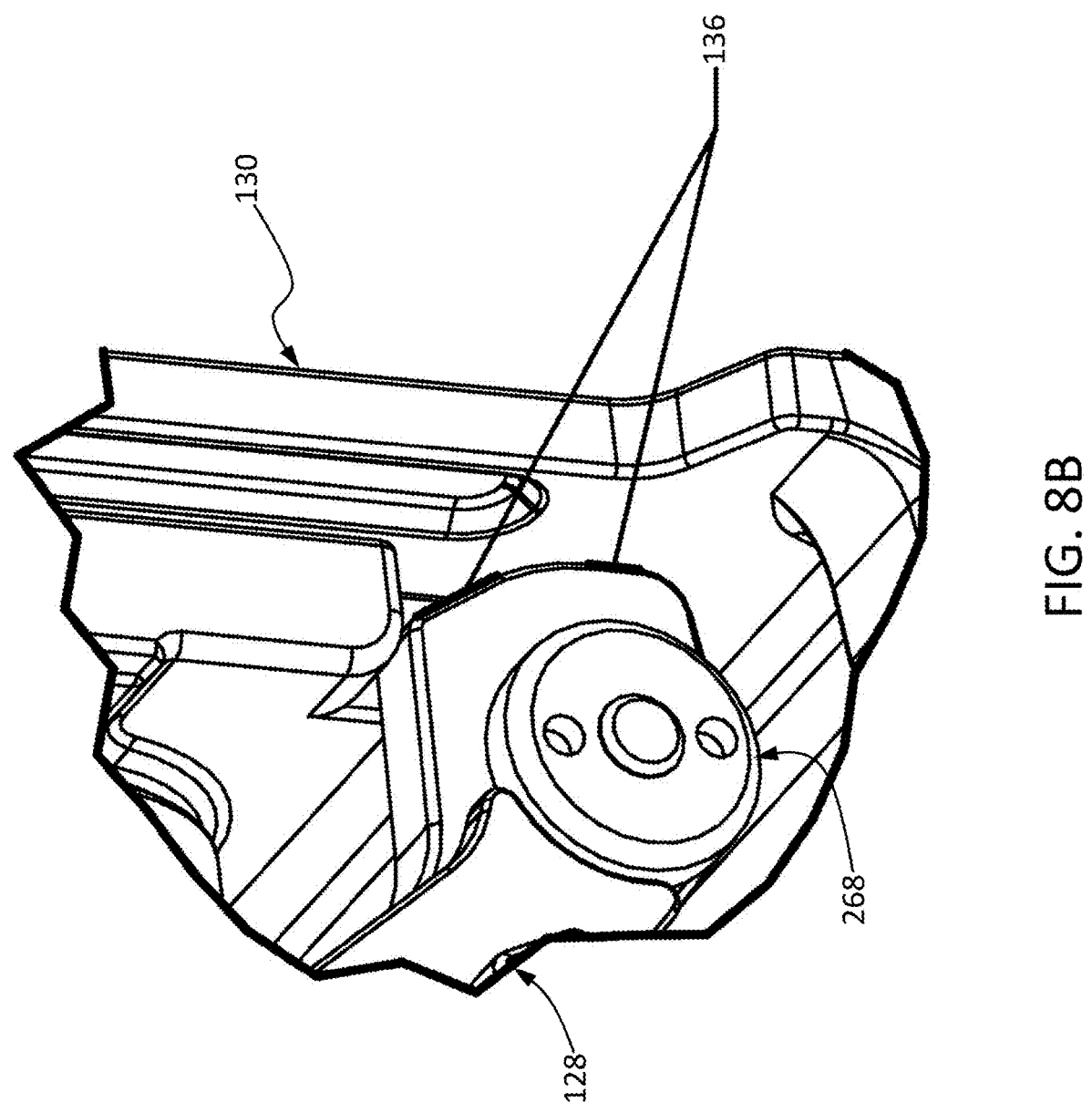
FIG. 8B is an enlarged view of the region 8B appearing in FIG. 8A.

Referring now to FIGS. 8A and 8B, the viewing device 110 is secured to the vertical adjustment subassembly 130 via a first set of threaded fasteners 260 engaging an upper housing portion of the viewing device 110 and a second set of threaded fasteners 264 engaging a rear housing portion of the viewing device 110. Alignment pins 262 extend from the vertical adjustment subassembly and are configured to engage complementary receptacles on the viewing device 110 for ensuring proper alignment of the vertical adjustment subassembly 130 with the viewing device 110. In embodiments, the forward facing side of the vertical adjustment subassembly 130 defines a mounting bracket for attaching the viewing device 110.

Figure 9:
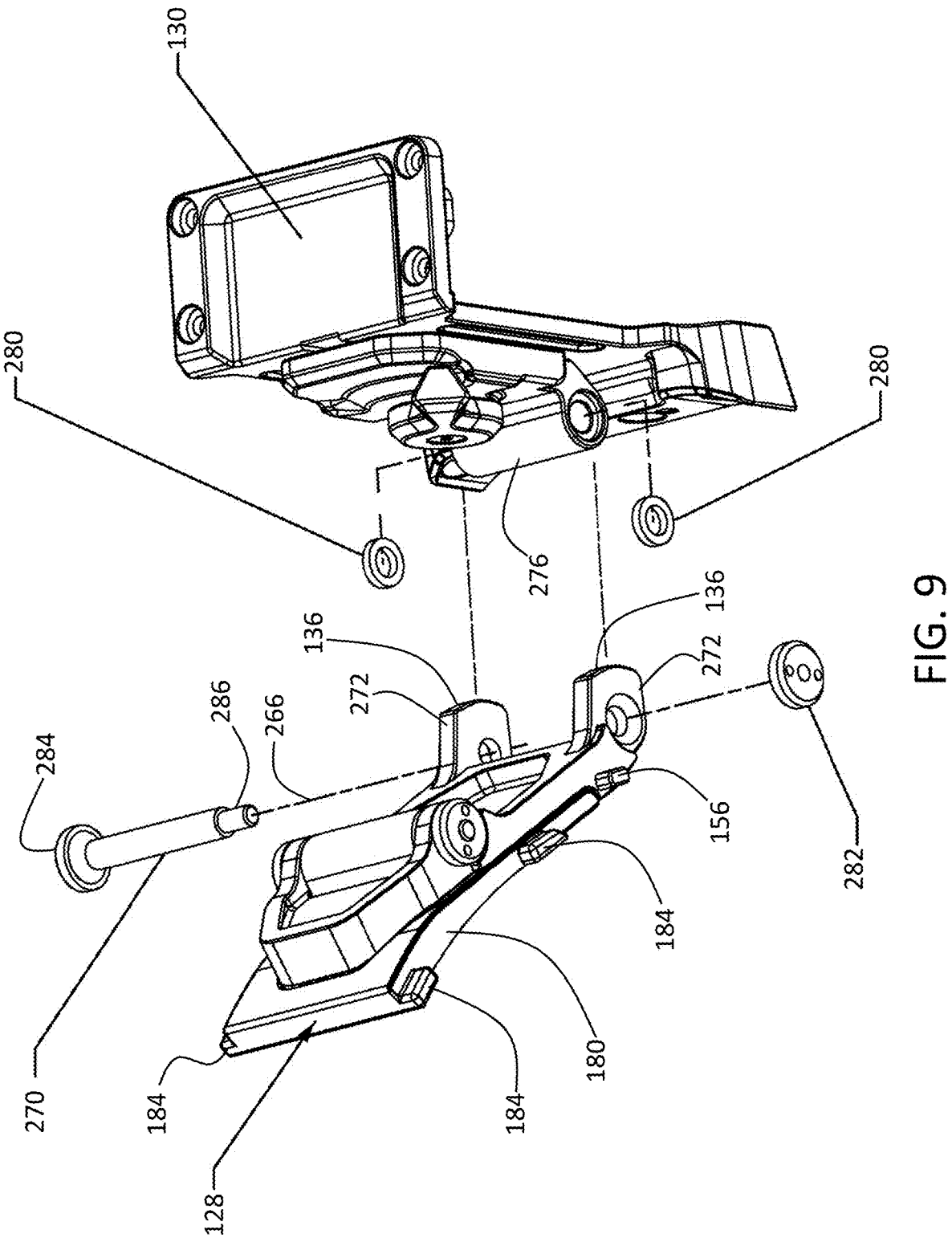
FIG. 9 is a partially exploded isometric view of the sliding carriage and vertical adjustment subassemblies.

Referring now to FIGS. 8A, 8B, and 9, the vertical adjustment subassembly 130 is pivotally attached to the sliding carriage subassembly 128 via a first pivot assembly 268 defining a pivot axis 266. The pivot assembly 268 includes a first pivot rod 270 passing through outer hinge knuckles 272 on the sliding carriage subassembly 128 and an inner hinge knuckle 276 on the vertical adjustment subassembly 130. A first tensioning washer 280 is disposed between one of the outer knuckles 272 and a head 284 of the rod 270. A second tensioning washer 280 is disposed between the other one of the outer knuckles 272 and a threaded cap 282 engaging a threaded end 286 of the rod 270. The cap 282 is tightened to provide a constantly tensioned pivot assembly that allows about, e.g., 30 degrees or more of rotational tilt, with the extent of pivoting rotation being limited by the tilt limiting stop flats 136.

Figure 10A:
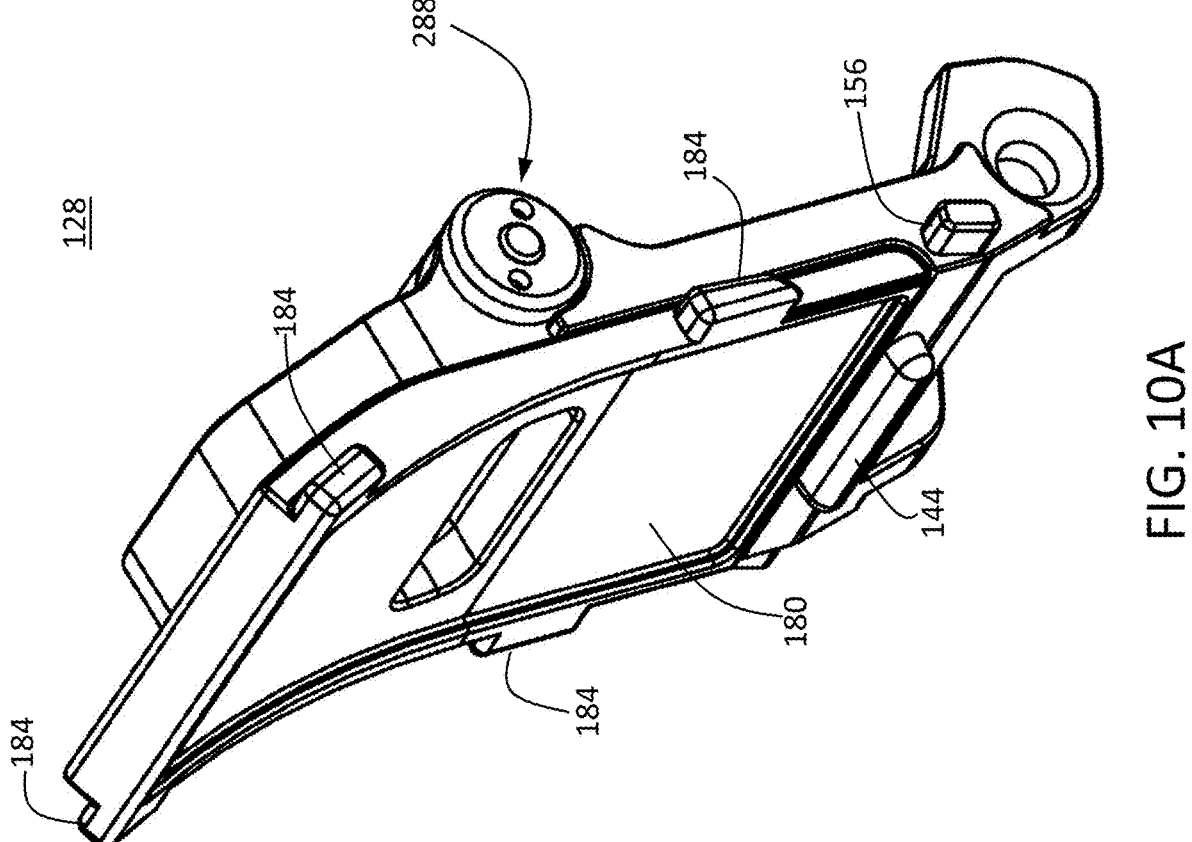
FIG. 10A is a generally rear isometric view of the sliding carriage subassembly.
Figure 10B:
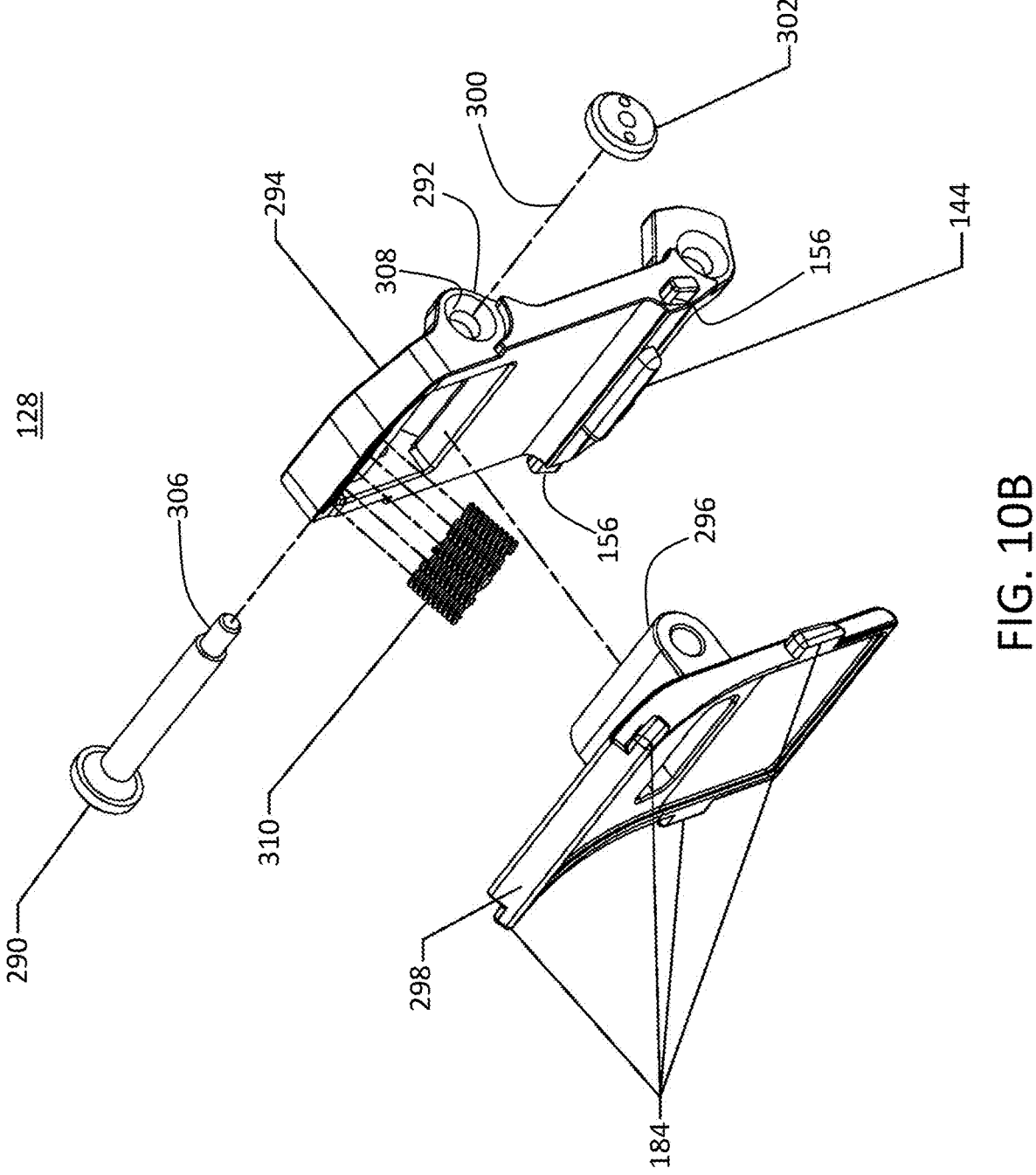
FIG. 10B is a generally rear exploded isometric view of the sliding carriage subassembly.

Referring now to FIGS. 10A and 10B, a second pivot hinge assembly 288 defines a pivot axis 300 and includes a second pivot rod 290 passing through second outer hinge knuckles 292 on a carriage pivot lock plate 294 and a second inner hinge knuckle 296 on a slide carriage plate 298. The inner hinge knuckle 296 passes through an opening 308 in the carriage pivot lock plate 294. A threaded cap 302 engages a threaded end 306 of the rod 290. Compression springs 310 are disposed between the upper end of the carriage pivot lock plate 294 and the upper end of the slide carriage plate 298. The springs bear against the upper end of the carriage pivot lock plate 294, thereby biasing the carriage locking tongue 144 toward the track assembly 124 to secure the tongue 144 into engagement with the groove 148 when the main sliding carriage assembly 128 is in the deployed position and to secure the locking tabs 156 into engagement with the locking shoulders 158 when the main sliding carriage assembly 128 is in the stowed position.

Figure 11A:
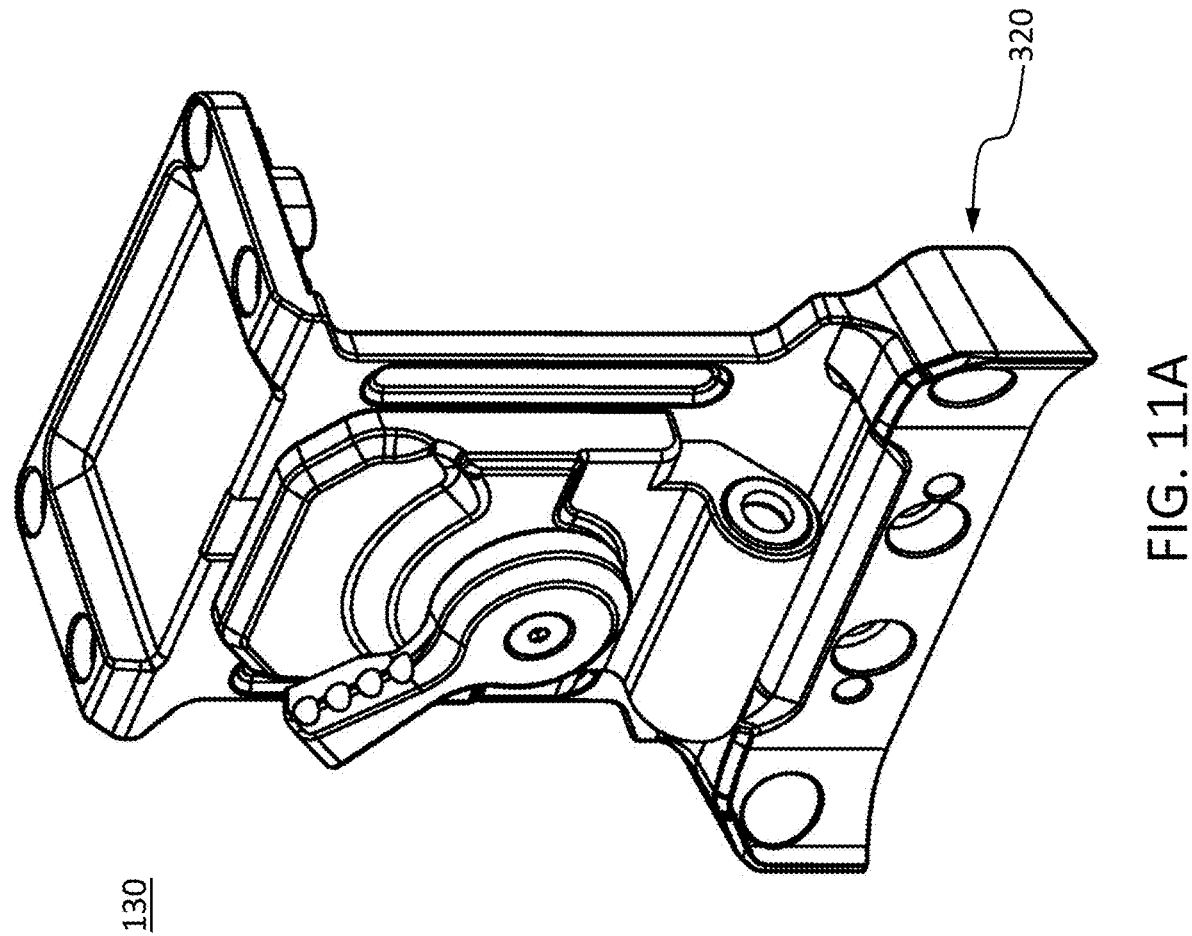
FIG. 11A is an isometric view of the vertical adjustment subassembly.
Figure 11B:
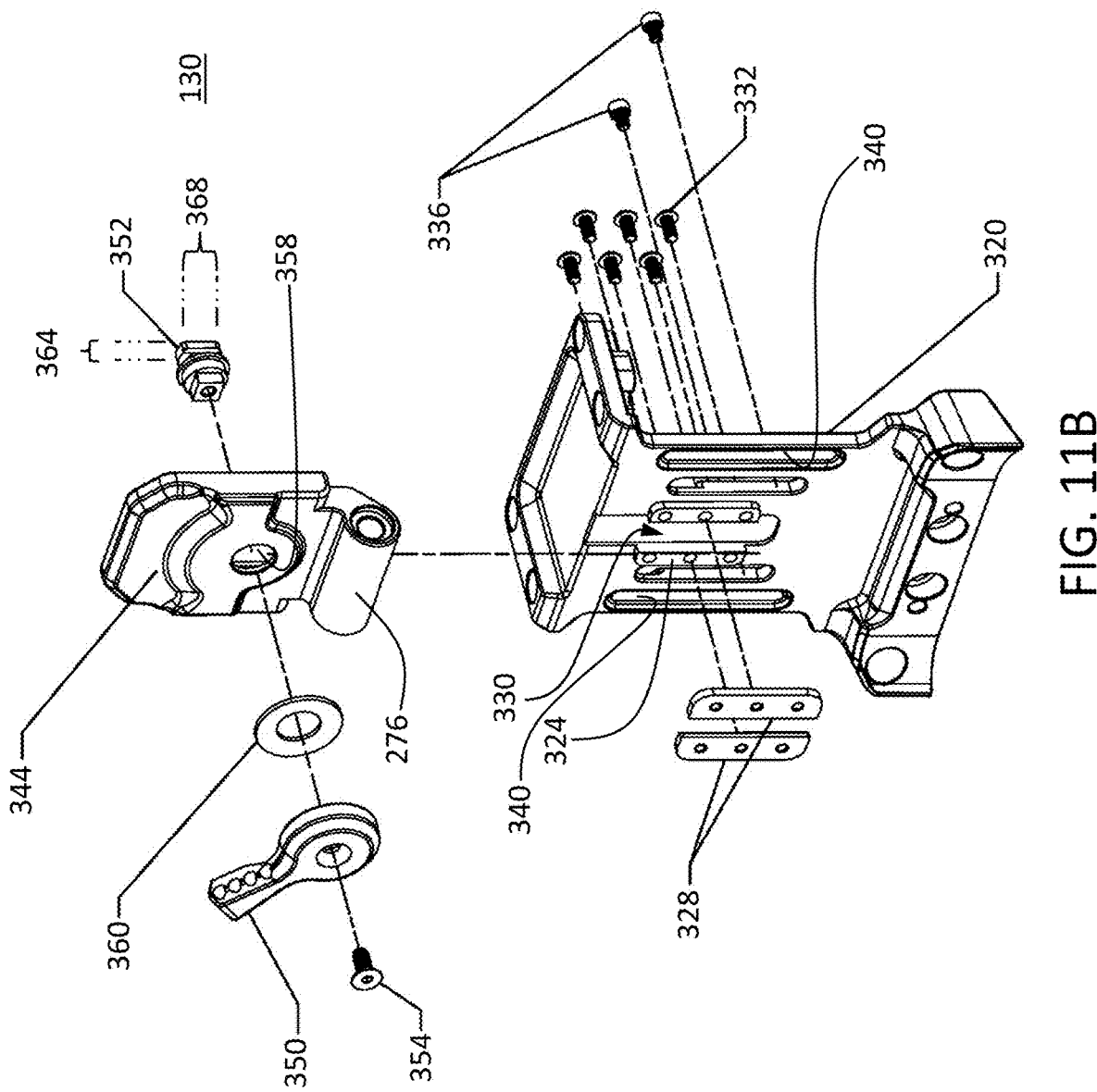
FIG. 11B is an exploded isometric view of the vertical adjustment subassembly.

Referring now to FIGS. 11A and 11B, the vertical adjustment subassembly 130, includes a base member 320 which is secured to the housing of the viewing device 110 as described above. A lock rail assembly comprises elongate vertical bosses 324 having elongate lock rails 328 attached thereto with threaded fasteners 332 and defining a channel 330 therebetween.

Travel limiters 336 pass through and ride in elongate vertical slots 340 and threadably engage a vertical adjust pivot plate 344. The slots 340 limit the extent of vertical travel of the vertical adjust pivot plate 344 locking tabs relative to the base member 320. A lock lever 350 is secured to a rear facing side of the vertical adjust pivot plate 344 and a cam lock member 352 is secured to a front facing surface of the vertical adjust pivot plate 344 via a threaded fastener 354 passing through a clearance opening 358 in the vertical adjust pivot plate 344. A conical washer or disc spring 360 is disposed between the lever 350 and the vertical adjust pivot plate 344 to develop a tension therebetween.

The cam lock member has a narrow dimension 364 and a wide dimension 368. When the cam lock member 352 is rotated using the lever 350 so that the narrow dimension 364 is aligned with the channel 340, the vertical adjust pivot plate 344 can slide freely along the lock rails 328, allowing the vertical adjust pivot plate 344 be positioned at a desired height to vertically align the viewing device 110 with the to the user's eyes. When the lever 350 is rotated to rotate the wide dimension 368 toward a transverse orientation, the cam lock member 352 wedges tightly within the channel 340 to create a secure locked position.

Now referring to FIGS. 12-21B, a second embodiment of a reclining helmet mount assembly 100*a* is provided. The first embodiment of the assembly 100, discussed above with reference to FIGS. 1-11, discloses the sliding carriage subassembly 128 (see FIGS. 1, 2, 4A-4D, 5, 8A, 8B, 9, 10A, and 10B) moving between stowed and deployed positions with a force to overcome mechanism. The second embodiment of the assembly 100a, discussed below, discloses a main sliding carriage subassembly 128a which is configured to be positioned at a stowed position 604 and a deployed position 600 and any position therebetween (as illustrated in FIGS. 20A-20C) with a push button mechanism. In embodiments, a detent mechanism is provided which allows the main sliding carriage subassembly 128a to be positioned at a predetermined intermediate position which corresponds to a navigation position. As used herein the term "navigation position" means that the viewing device 110 is raised sufficiently above the user's line of sight so as to not substantially obstruct the user's forward field of view while also allowing the user to shift their gaze upward in order to view a visible output of the viewing device 110.

Figure 12:
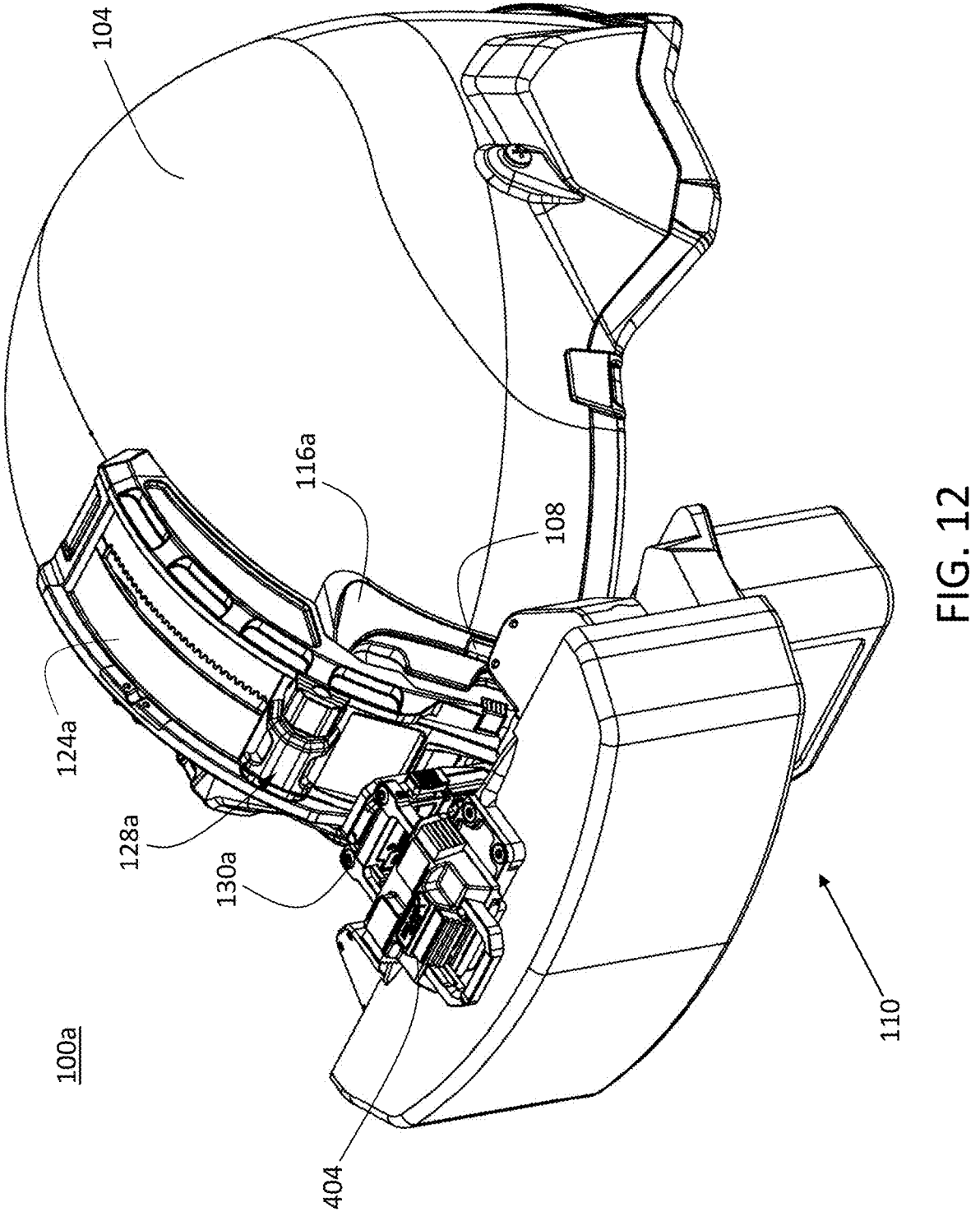
FIG. 12 is an isometric view of a helmet employing a second embodiment of the reclining helmet mount apparatus in conjunction with a first shroud.
Figure 13:
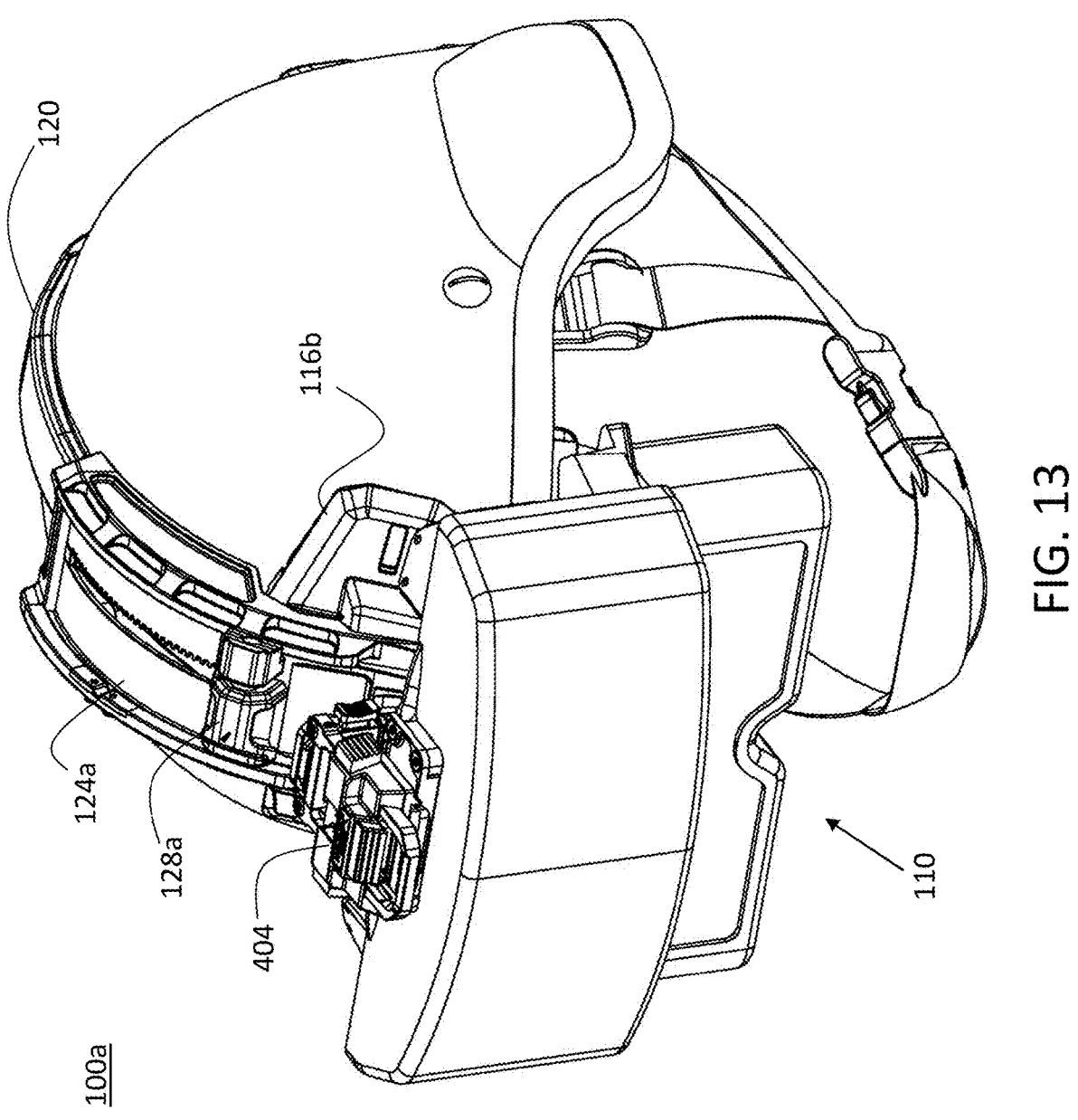
FIG. 13 is an isometric view of a helmet employing the second embodiment of the reclining helmet mount apparatus in conjunction with a second shroud and attachment system.
Figure 14:
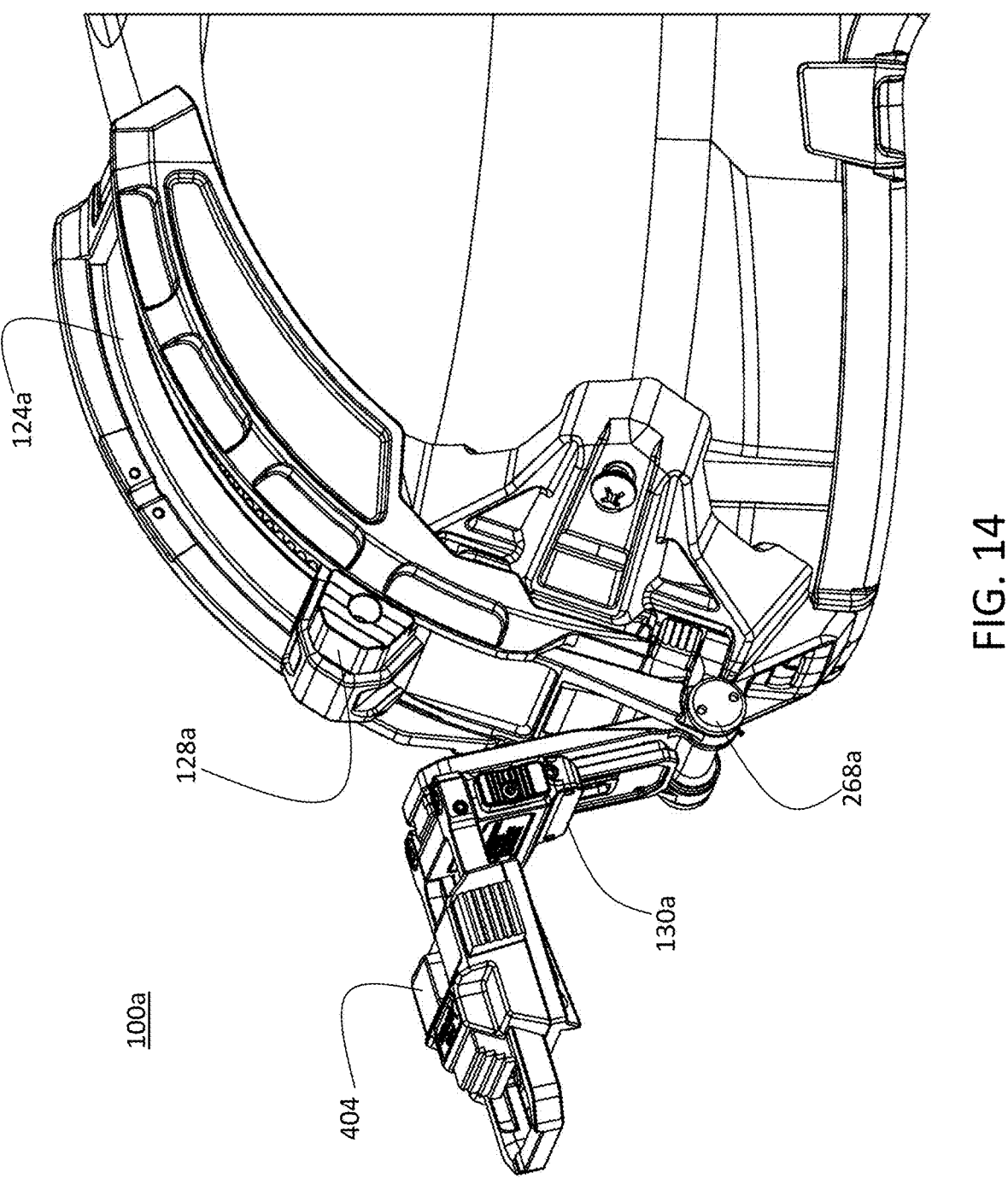
FIG. 14 is an isometric view of a helmet employing the second embodiment of the reclining helmet mount apparatus with the viewing device omitted.

Referring first to FIGS. 12-14, like the helmet mount assembly 100, the helmet mount assembly 100a may be used advantageously in conjunction with front shrouds, such as the front shrouds 116a, 116b and other attachment systems 120 for attachment to a helmet 104. Also like the helmet mount assembly 100, and as described above, the helmet mount assembly 100a may include a shroud interface assembly 108. The assembly 100a includes a pivot assembly 268a that allows pivoting adjustment between the main sliding carriage assembly 128a and the vertical adjustment assembly 130a. As described in detail below, the assembly 100a includes a modified track subassembly 124a, sliding carriage subassembly 128a, and vertical adjustment subassembly 130a. An axial sliding assembly 404 includes an axial slide carriage plate 410 and allows for axial, i.e., fore-and-aft) horizontal adjustment of the viewing device 110 to achieve a proper focal distance between the viewing device 110 and the user's eyes. The fore and aft carriage assembly 404 is secured to a vertically movable component of the vertical adjustment subassembly 130a which allows for vertical adjustment with respect to the user's eyes.

Figure 15A:
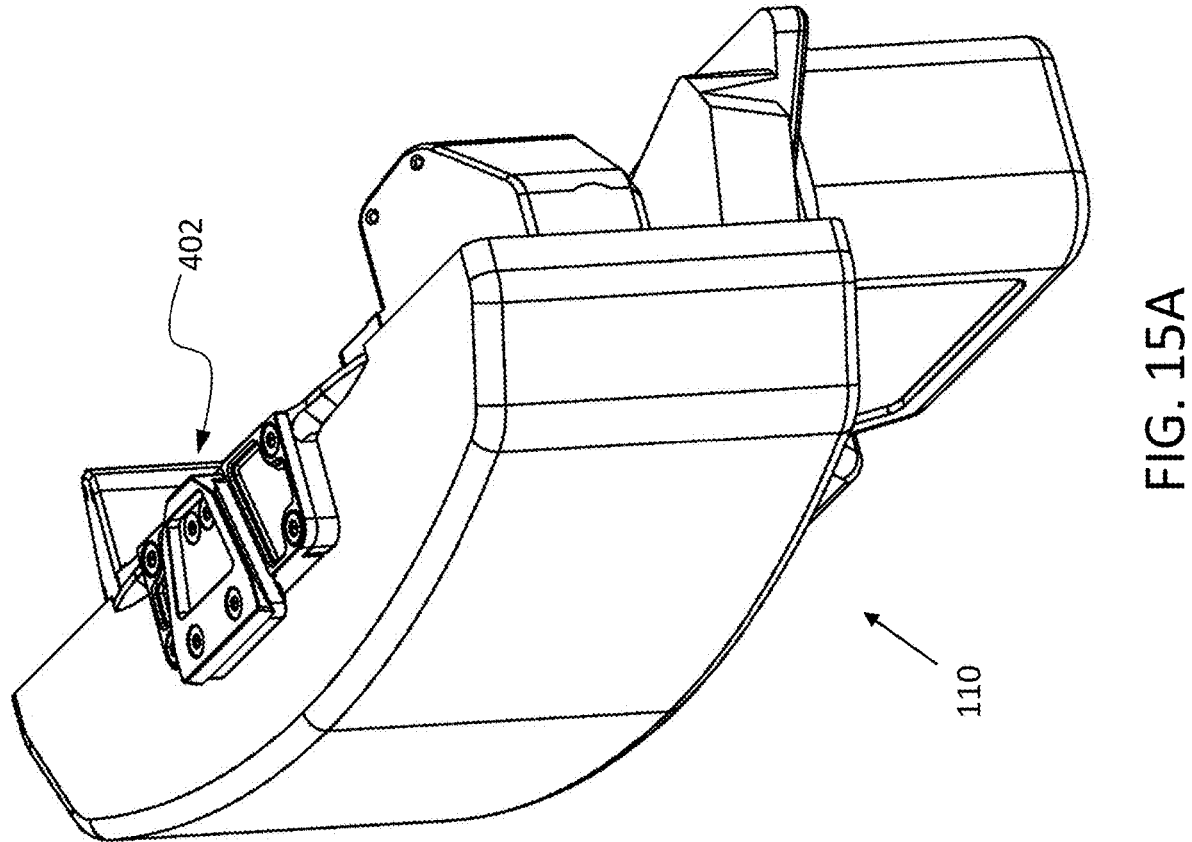
FIG. 15A is an isometric view of a viewing device including a viewing device connection subassembly for connection with an axial sliding assembly.
Figure 15B:
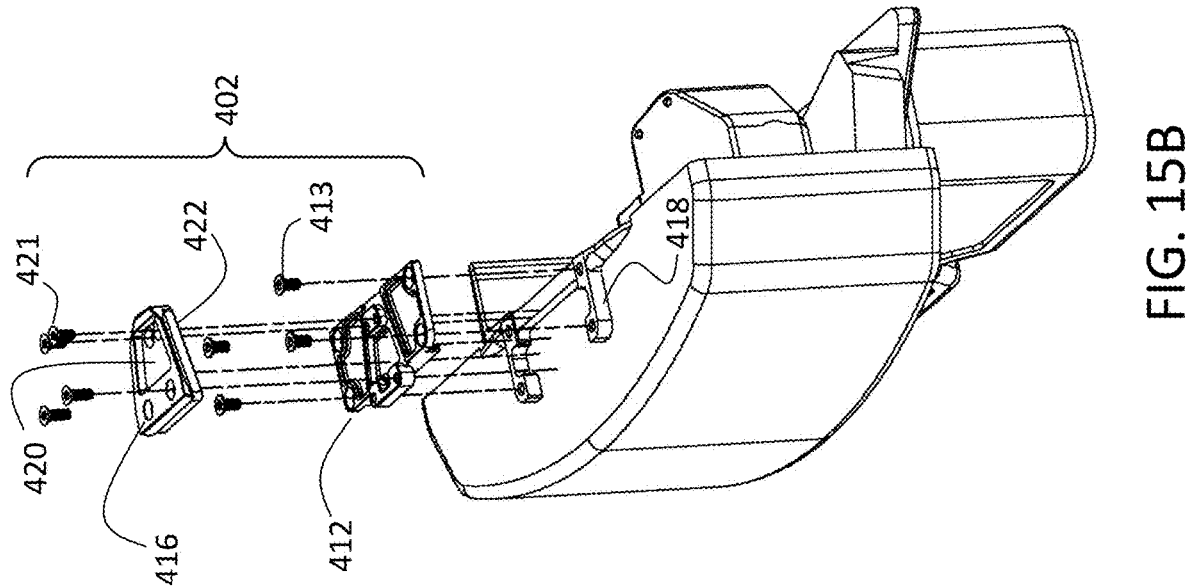
FIG. 15B is a partially exploded view of the viewing device connection subassembly.

Now referring to FIGS. 15A and 15B, there appear isometric views of the viewing device 110 having the viewing device interface assembly 402 thereon for adapting the viewing device for detachable coupling to the axial sliding assembly 404. The interface assembly 402 is applied to a housing of the viewing device 110. In the illustrated embodiment, the interface assembly 402 includes a mounting bracket or base plate 412 and a mounting shoe 416. In embodiments, the mounting show is a dovetail mounting shoe. 416. The mounting shoe 416 is configured to detachably mate with a complementary mounting shoe receiver on the axial sliding assembly 404. The base plate 412 is secured to a mounting boss or other mounting fixture 418 on the housing of the viewing device 110. It will be recognized that the base plate 412 may be adapted for comparability with viewing devices 110 having other mounting interface configurations.

The base plate 412 is shown secured to the viewing device 110 with threaded fasteners 413 which pass through clearance openings in the base plate 412 and threadably engaged aligned opening in the boss 418. Other means for such attachment are also contemplated and included within the scope of the present invention. The mounting shoe 416 includes an opening recess 420 which is sized and dimensioned to receive a carriage catch or lock lever 414 on the axial sliding assembly 404, discussed below with reference to FIG. 16B. The mounting shoe 416 is shown secured to the base plate 412 with threaded fasteners 421 which pass through clearance openings in the mounting shoe 416 and threadably engage aligned openings in the base plate 412.

Other common means for such attachment are also contemplated and included within the scope of the present invention.

Figure 16A:
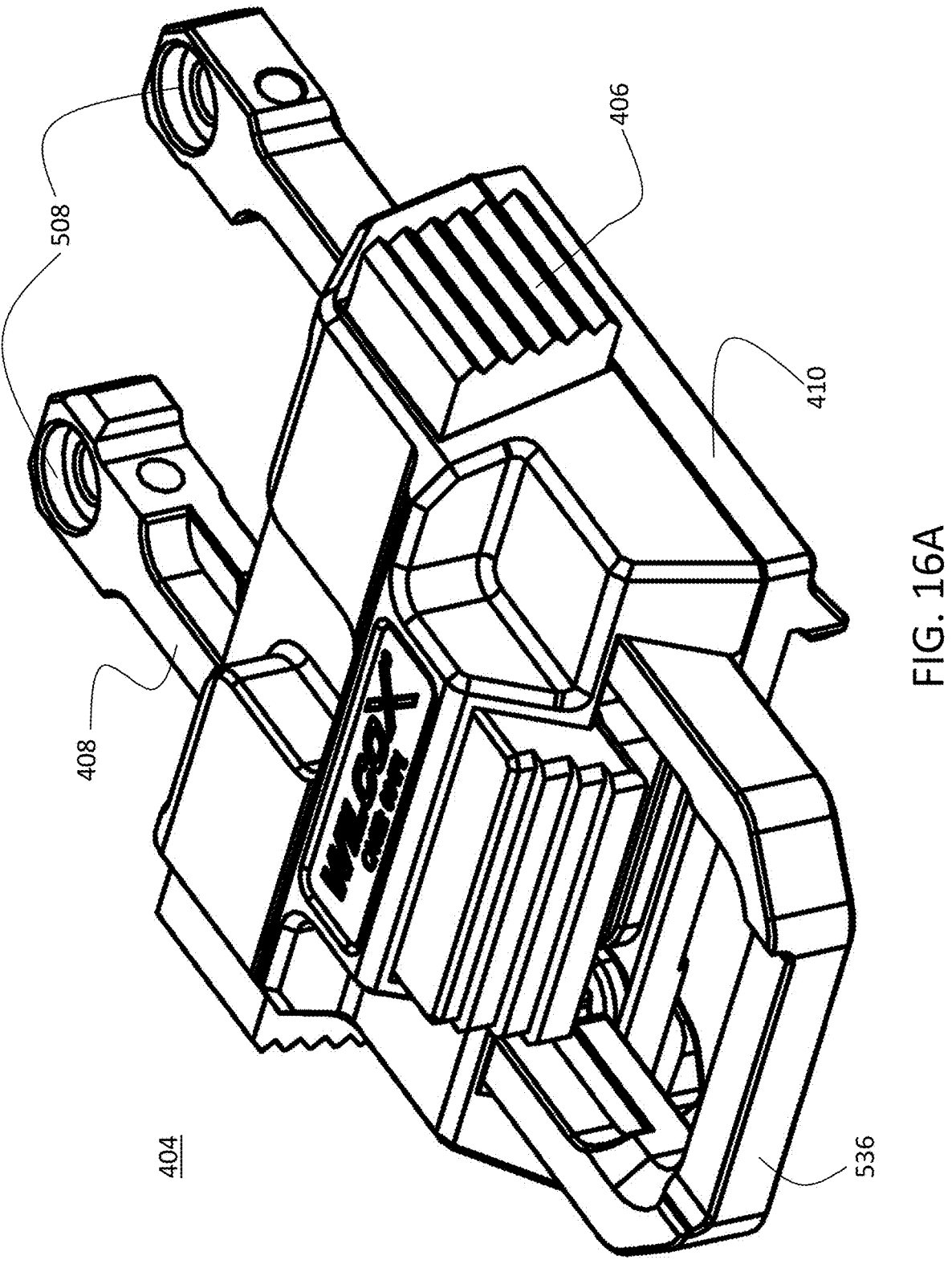
FIG. 16A is an enlarged isometric view of an axial sliding assembly for adjusting a focal distance of the viewing device from a user's eyes.
Figure 16B:
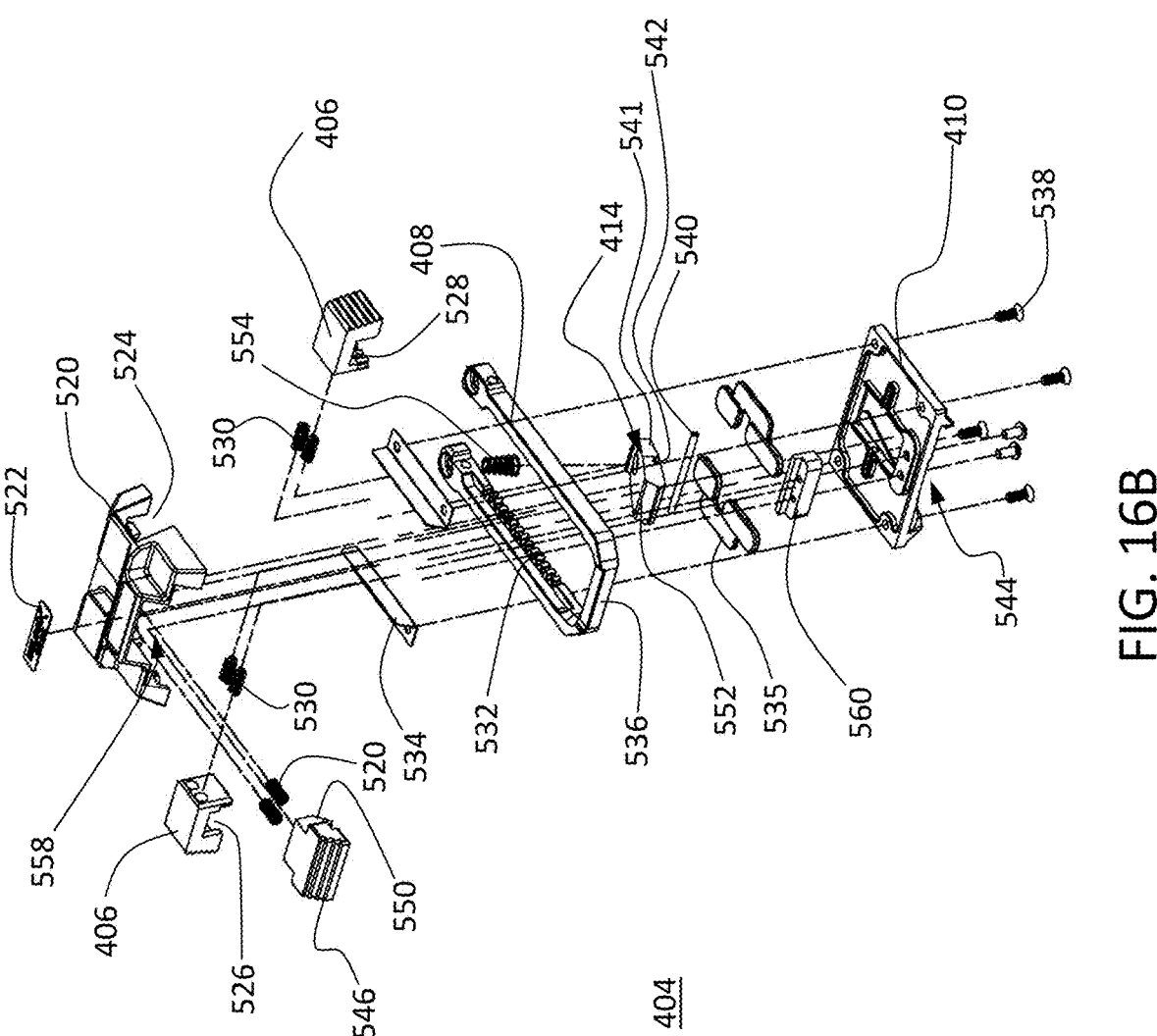
FIG. 16B is an exploded isometric view of the axial sliding assembly of FIG. 16A.

Now referring to FIGS. 16A and 16B, with continued reference to FIGS. 15A and 15B, isometric views of the axial sliding assembly 404 are provided. The axial sliding assembly 404 includes a fore and aft slide carriage housing 520 which may include a label or other indicia 522 thereon. Manually actuatable slide release buttons 406 are disposed within first and second notches 524 formed on opposite transverse sides of the carriage housing 520 received within and slide rails 408.

Various forms of the axial sliding assembly 404 are as described as "sliding carriage 236" in FIG. 5 and "carriage 230" in FIGS. 8A and 8B of co-owned U.S. Pat. No. 7,219,370: "sliding carriage 136" in FIG. 3B, "sliding carriage 512" in FIG. 9; "sliding carriage 612" in FIG. 10, and "second pivoting portion 703" in FIGS. 11, 12A, and 12B of co-owned U.S. Pat. No. 8,739,313; and FIG. 4 of co-owned U.S. Pat. No. 9,775,395 (as discussed above, each co-owned patent is incorporated in its entirety herein by reference). For the avoidance of doubt, the axial sliding assembly 404 is a different structure with a different function from the main sliding carriage subassemblies 128, 128a. The axial sliding assembly 404 allows for sliding adjustment of the focal distance between the viewing device 110 and the user's eyes. The sliding carriage subassembly 128, 128a allows for sliding adjustment of a position of the entire helmet mount assembly 100, 100a with respect to the helmet 104.

The slide release buttons 406 each include an axially extending channel 526 having locking teeth 528 formed on a wall thereof. Captured spring elements 530 urge the slide release buttons outward in the transverse direction such that the teeth 528 engage complementary teeth 532 disposed on the facing surface of the slide rails 408. To manually slide the slide carriage in the fore and aft direction, the buttons 406 are manually squeezed together to compress the springs 530 to disengage the teeth 528, 532. Sliding movement of the slide carriage along the rails 408 is guided by upper carriage guides 534 secured within the upper carriage housing 520 and lower carriage guides 535 secured to a mounting shoe interface plate 410. In the depicted embodiment, the sliding rails 408 have proximal ends which are secured to a vertical adjustment carriage 424 (see, e.g., FIG. 17A). In embodiments, the distal ends of the rails 408 are connected by a transverse segment 536 which serves as a mechanical stop to prevent the sliding carriage from sliding longitudinally past the distal ends of the rails 408 and enhances structural stability of the rails 408 by maintaining the parallel alignment and reducing flex under load.

The slide carriage housing 520 is secured to mounting shoe interface plate 410 which is disposed on the underside (in the orientation shown) of the rails 408. The mounting shoe interface plate 410 is secured to the carriage housing 520 via threaded fasteners 538 which pass through clearance openings in the mounting shoe interface plate 410 and threadably engage aligned opening in the carriage housing 520. The mounting shoe interface plate 410 includes a mounting shoe receptacle 544 which detachably receives the mounting shoe 416 on the viewing device 110.

A lock lever 414 is pivotally secured within the axial sliding assembly 410 about a lock lever pivot pin 540, which acts as a fulcrum. The lock lever pivot pin 540 is received within a transverse channel 542 on the lock lever 414. A lock lever spring 554 is captured within the housing 520 and bears against an upper surface of the lock lever 414 on one side of the fulcrum to thereby urge a latch member portion 541 of the lock lever 414 downward and into the mounting shoe receptacle 544. When the viewing device 110 is attached to the axial sliding assembly, the mounting shoe 416 is slidably received within the mounting shoe receptacle 544. As the leading edge of the mounting shoe 416 moves past the lock lever 414, the lock lever spring 554 is compressed as the catch portion of the lock lever 414 is moved upward. Once the mounting shoe 416 is fully seated in the mounting shoe receptacle 544, the spring urges the lock lever 414 into the recess 420 on the mounting shoe 416 for secure retention of the viewing device 110 to the carriage assembly.

To remove the viewing device 110 to the carriage assembly, a lock lever release button 546 is received within a channel 558 on the housing 520 and is manually depressible in the axial direction against the urging of one or more captured spring elements 548 disposed within the housing 520. The lock lever release button 546 includes a ramped, curved, or inclined surface 550 which engages a facing ramped, curved, or inclined surface 552 on the lock lever 414. When the button 546 is manually depressed, the surface 550 moves with respect to the surface 552 to create a wedging action which pivots the locking lever 414 and withdraws the locking lever from the recess 420 on the mounting shoe 416, allowing the mounting shoe 416 to be withdrawn from the mounting shoe receptacle 544. A release button stop 560 retains and limits the axial movement of the release button 546.

Figure 21A:
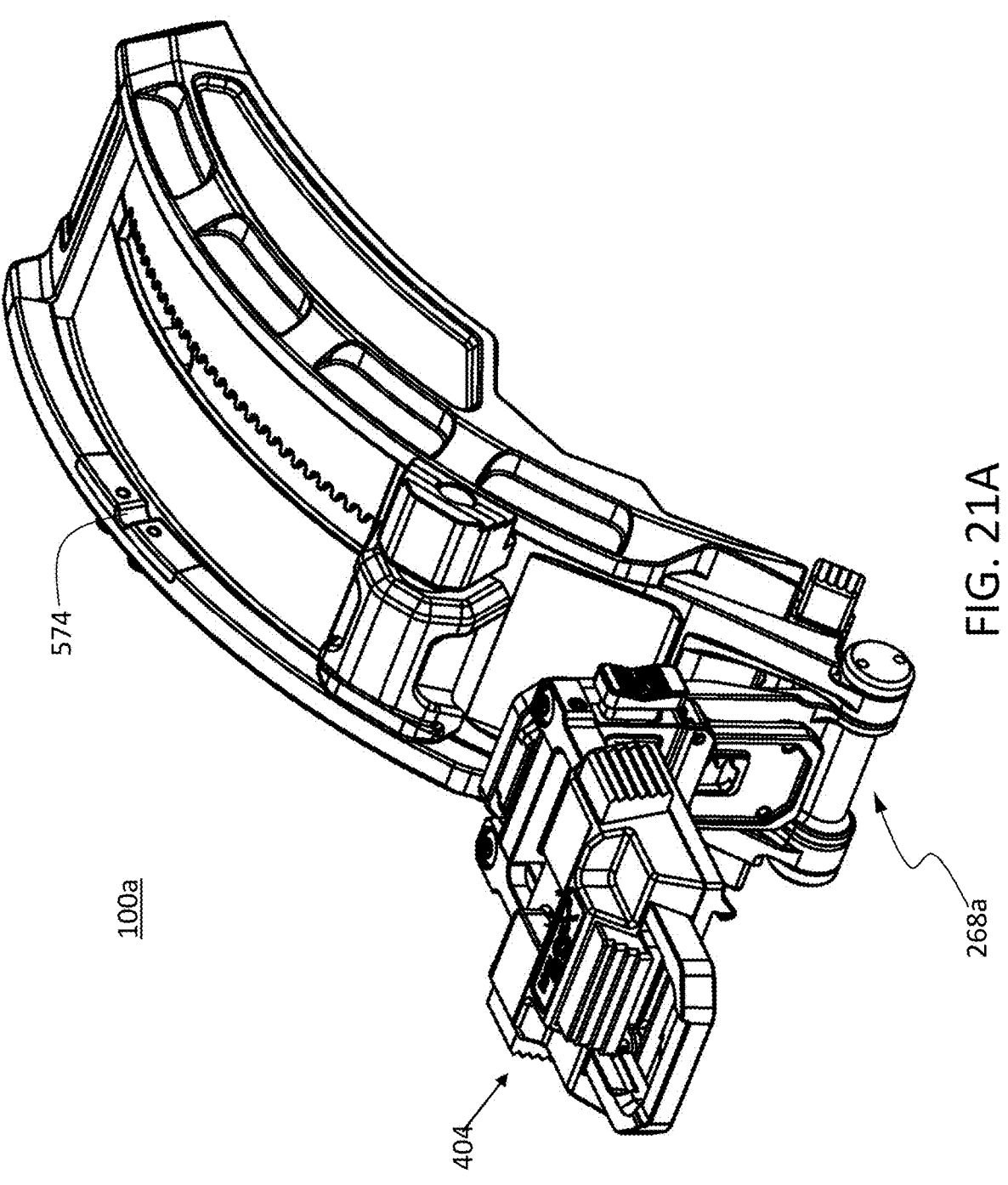
FIG. 21A is an isometric view of the helmet mount apparatus with vertical adjustment assembly and sliding carriage for adjusting focal distance.
Figure 21B:
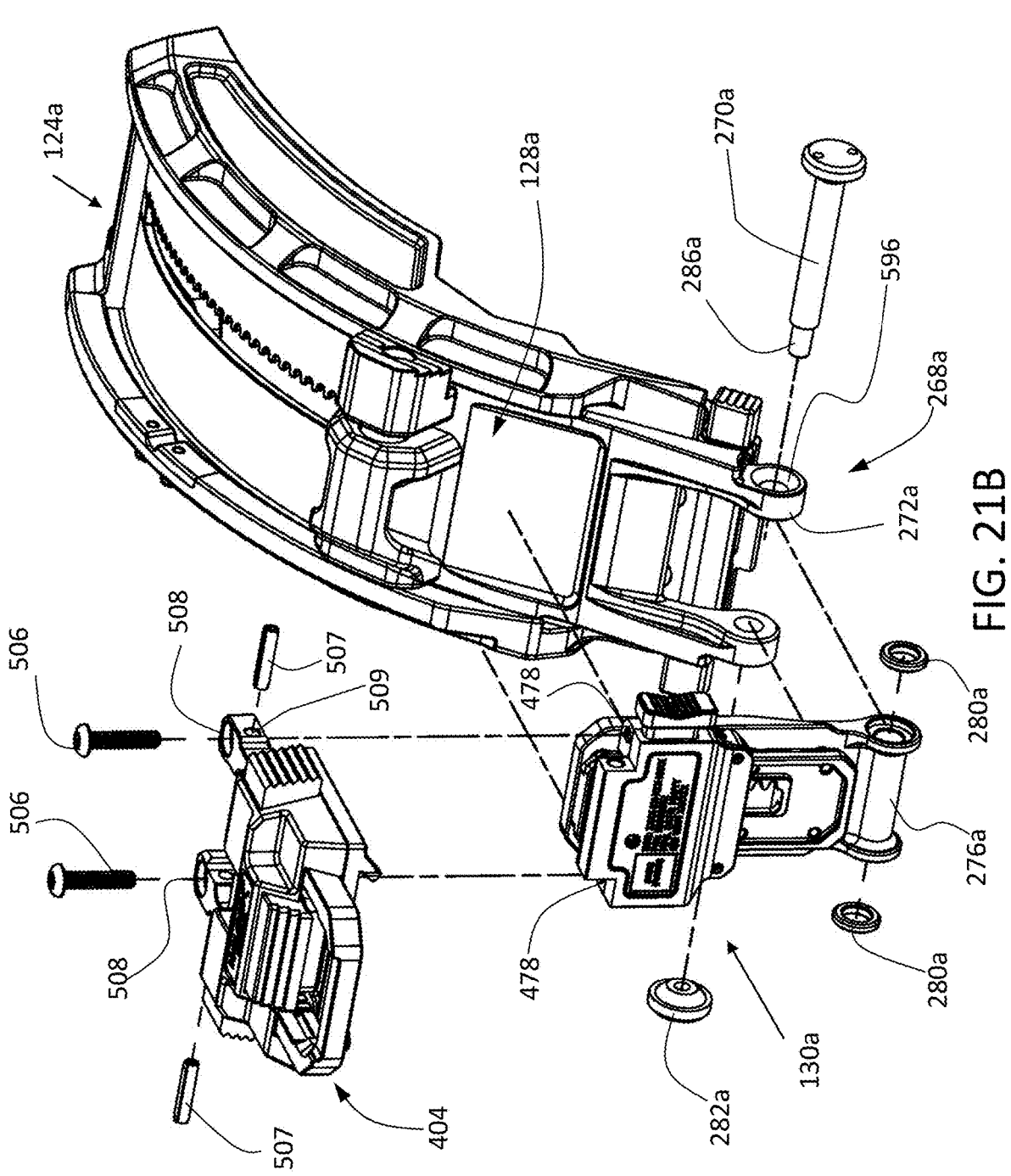
FIG. 21B is an exploded view of the helmet mount apparatus of FIG. 21A.

In embodiments, the axial sliding assembly 404 includes vertical adjustment connection points 508 and 509 where the sliding rail arms 408 are secured to the vertical adjustment carriage 424 of the vertical adjustment subassembly 130a via vertical threaded fasteners 506 and transverse fastening pins 507 (see FIG. 21B). In the illustrated embodiment, the slide rail arms 408 comprise two parallel cantilever arms extending from the vertical adjustment carriage 424, wherein the distal ends of the arms are linked by a transverse member 536. By utilizing orthogonal fasteners at the connection points, vertical, side to side, and rotational forces are better managed and load exerted on the sliding rail arms 408 is spread over a greater area.

Figure 17A:
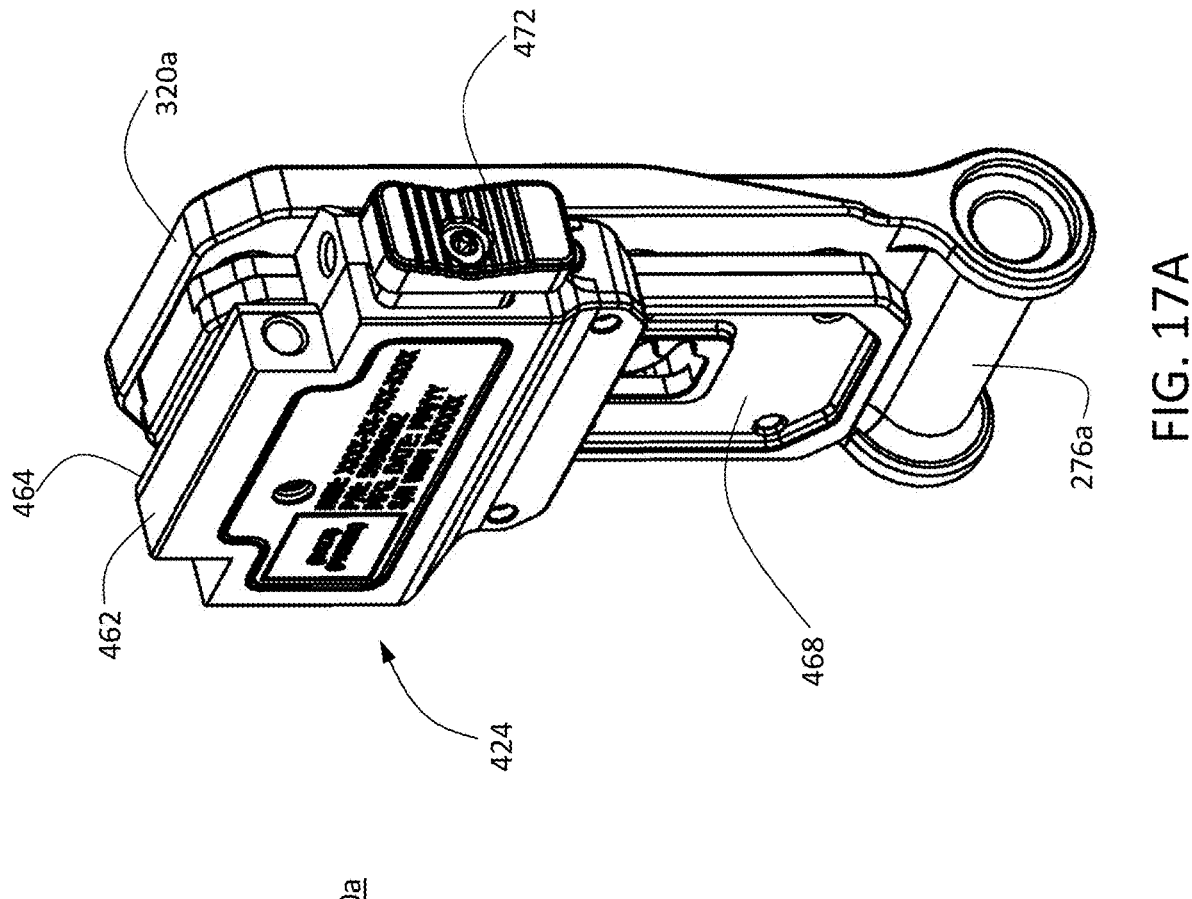
FIG. 17A is an isometric view of an exemplary vertical adjustment assembly.
Figure 17B:
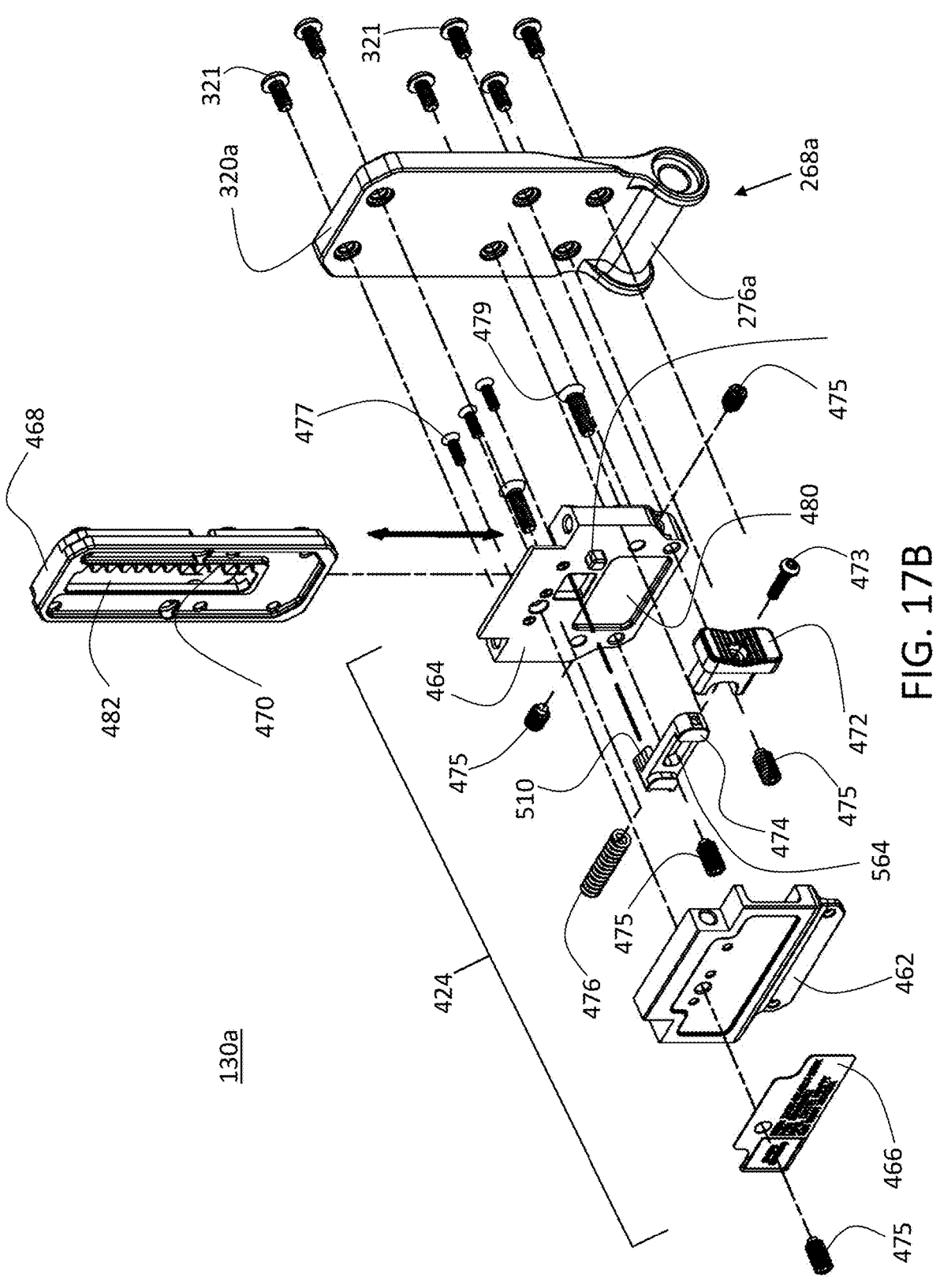
FIG. 17B is an exploded view of the exemplary vertical adjustment assembly of FIG. 17A.

Now referring to FIGS. 17A and 17B, isometric views of the vertical adjustment subassembly 130a are provided. The vertical adjustment subassembly 130a is an alternative to the vertical adjustment subassembly 130, detailed, for example, with reference to FIGS. 11A-11B. The vertical adjustment subassembly 130a may be substituted for vertical adjustment subassembly 130 in the first embodiment of the helmet mount assembly 100 and vertical adjustment subassembly 130 may be substituted for vertical adjustment subassembly 130a in this second embodiment of the helmet mount assembly 100. Like the vertical adjustment subassembly 130, vertical adjustment subassembly 130a pivots with respect to the sliding carriage subassembly 128a via a pivot subassembly 268a. The pivot subassembly 268a integrates the first knuckles 272a of the sliding carriage subassembly 128a (see FIG. 18A) and the complementary second knuckle 276a of the vertical adjustment subassembly 130a, which cooperate to define a pivot barrel. The pivot subassembly 268a further includes a pivot rod 270a, tensioning washers 280a, and a tensioning endcap 282a (see FIG. 21B).

The vertical adjustment subassembly 130a includes a base member or plate 320a having a vertical gear rack 468 with a series of gear teeth 470 and an elongated, vertically extending opening 482. A vertical adjustment carriage 424 includes vertical adjustment front and rear plates 462, 464, respectively. A vertical slide lock release 472, notched slide lock 474, and vertical adjustment spring 476 are also provided. In certain embodiments, the vertical adjustment subassembly 130a includes a label 466 or other indicia attached to the front plate 462, which may include identifying information or other indicia. As best seen in FIG. 21B, the vertical adjustment carriage 424 includes axial sliding assembly connection points or notches 478 where the proximal ends of the slide rail arms 408 are rigidly attached to the vertical adjustment subassembly 130a, the slide rail arms 408 forming a cantilever. A boss 562 on the plate 464 is slidably received within an elongated slot 564 on the slide lock 474 which defines a range of motion of the slide lock 474.

The vertical gear rack 468 is affixed to the base member 320a with threaded fasteners 321. The vertical adjustment carriage 424, to which the axial sliding assembly 404 is attached, is movable up and down with respect to the vertical gear rack 468, so as to change the height of the viewing device 110 with respect to the user's eyes. The vertical adjustment carriage 424 includes a vertical slide front plate 462 that houses the notched slide lock 474 and the vertical adjustment spring 476 such that the notched slide lock 474 is in mechanical communication with the vertical gear rack 468.

The vertical slide lock release 472 is disposed on the outside of the vertical adjustment front plate 462 and is secured to the notched slide lock 474 within the vertical adjustment carriage 424 with a threaded fastener 473. When depressed, the vertical slide lock release 472 presses the notched slide lock 474 against the urging of the spring 476, such that the notched slide lock 474 is free to move up and down within the gear rack opening 482. Once the viewing device 110 is at a desired height, the vertical slide lock release 472 is released, the spring 476 urges the notched slide lock 474 to engage with the vertical gear rack teeth 470, and the vertical adjustment carriage 424 is thereby held in place at the desired height. Adjustable set screws 475, preferably soft tip set screws having a soft tip formed of rubber, nylon, or other polymer material, or a soft metal such as brass, threadably engage the vertical adjustment carriage 424 at various points and adjustably bear against the gear rack 468 to adjust the tensioning of the sliding movement.

As shown, the vertical adjustment carriage 424 also includes a vertical adjustment rear plate 464 disposed between the base member 320a and the vertical adjustment front plate 462. The front and rear plates 462, 464 cooperate to house the notched slide lock 474 and the spring 476. The front and rear plates 462, 464 are secured with threaded fasteners 477, 479. The vertical adjustment rear plate 464 has a rear plate opening 480 that allows the working portion 510 of the notched slide lock 474 to pass through to engage with the vertical gear rack 468 while also being held between the rear and front plates 464, 462. As shown and as will be understood by persons skilled in the art, the vertical adjustment subassembly 130a is held together with threaded fasteners or pins. Other common means for such attachments are also contemplated and included within the scope of the present invention.

Figure 18A:
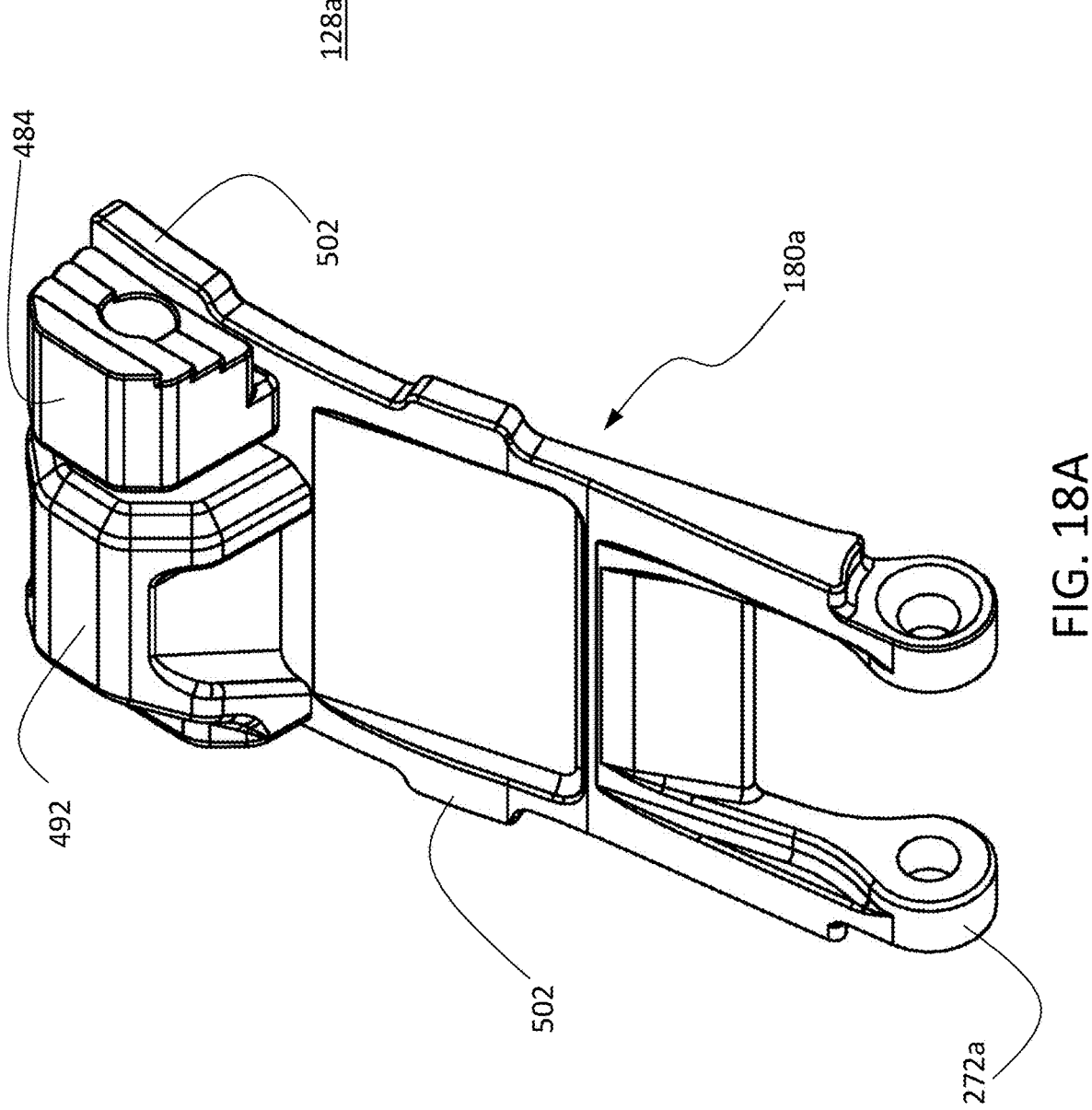
FIG. 18A is an isometric view of a sliding carriage subassembly with a push button mechanism.
Figure 18B:
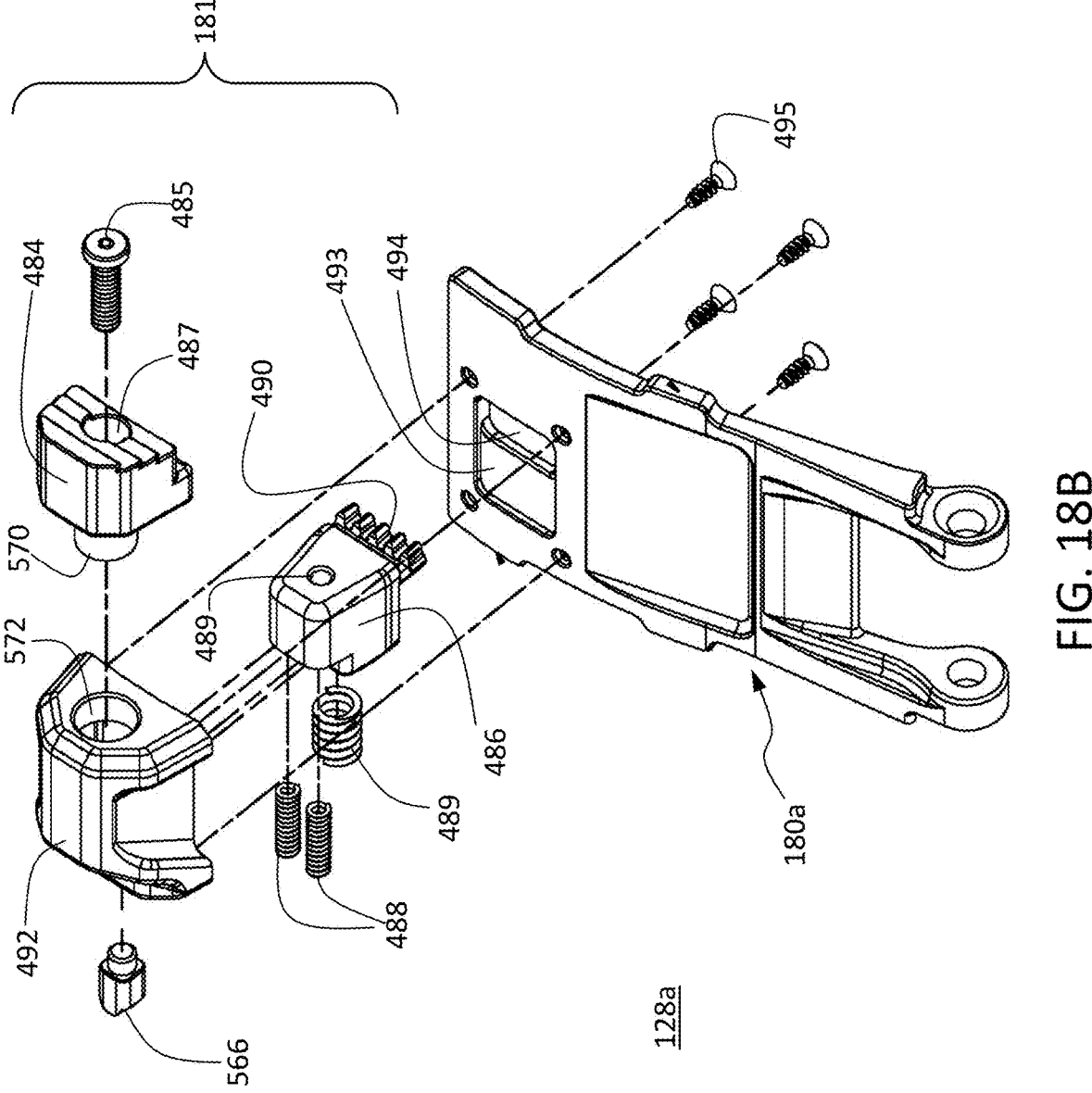
FIG. 18B is an exploded view of the sliding carriage subassembly of FIG. 18A.

Now referring to FIGS. 18A and 18B, isometric views of the sliding carriage subassembly 128a are provided. The sliding carriage subassembly 128a includes sliding carriage 180a, having a main slide lock assembly 181 disposed thereon. The main slide lock assembly 181 includes a slide lock housing 492 and a slide lock release button 484. The slide lock housing 492 houses one or more, preferably two, slide lock springs 488 which resiliently engage a notched slide lock member 486 having carriage locking teeth 490. Also housing within the slide lock housing 492 is a detent spring 489 which bears against a spring biased detent 566. The spring loaded detent 566 is only engaged when the slide lock release button 484 is pressed. The slide lock release button 484 is secured to the notched slide lock 486 via a threaded fastener 485 passing through a clearance opening 487 and threadably engaging an opening 489. The slide lock release button 484 sits within a recess 493 and the teeth 490 pass through an opening 568 in the sliding carriage 180*a*.

The slide lock housing 492 is affixed to the sliding carriage 180*a* via threaded fasteners 495 which pass through clearance openings 497 in the sliding carriage 180*a* and threadably engage aligned openings (not shown) in the slide lock housing 492. The sliding member plate 180*a* has an opening 494 therethrough, through which the carriage locking teeth 490 extend so as to engage with the track teeth 496, as discussed below. The slide lock release button 484 is disposed adjacent to the slide lock housing 492 and includes a transverse boss 570 which extends into an aperture 572 in the slide lock housing 492.

When the slide lock release button 484 is depressed, the notched slide lock 486 is moved against the urging of the springs 488 in the transverse direction toward the center of the track and out of engagement with the track teeth 496 so that the sliding carriage 180*a* may freely move along the track 500, as discussed below, such that the entire main carriage assembly 128*a*, and everything attached thereto (i.e., the vertical adjustment assembly 130*a*, the axial sliding assembly 404, and the viewing device 110) may be moved to any desired position along the track 500. During sliding movement, the slide lock member 486 runs in the elongated slot 498. Once the sliding carriage subassembly 130*a* is disposed at a desired position along the track 500, the slide lock release button 484 is released, the springs 488 urge the carriage locking teeth 490 to engage with the track teeth 496 at that position, and the sliding carriage subassembly 130*a* is thereby held in place at the desired position with respect to the helmet 104.

In operation, when the slide lock release button 484 is pressed, the spring 489 urges the detent member 566 outward so that it bears against the opposing sidewall of within the track channel and is configured to resiliently engage a complementary detent recess 574 (see FIG. 19A) formed in the sidewall when aligned therewith during sliding movement of the sliding carriage 180*a*. The axial position of the detent recess 574 thereby defines a preferential stopping position of the sliding carriage when the position of the sliding carriage 180*a* is being moved along the track 500.

In embodiments, the detent recess 574 is disposed in a detent plate 576 secured within the track. In embodiments, a plurality of detent plates 576 are provided, which are interchangeable with each other, wherein each interchangeable detent plate 576 has the detent recess 574 formed therein at a axial different position such that the detent recess 574 will be positioned at a desired position along the track to achieve a desired raised position where the sliding carriage 180*a* will natural tent to stop, i.e., corresponding the user's desired navigation position, wherein the viewing device 110 is elevated above the user's line of sight such that the user can view the view the output of the viewing device 110 by casting their eyes upward. In this manner, the provision of multiple, interchangeable detent plates 576 allows customization of the preferential stopping position of the sliding carriage 180*a* by allowing the user to swap the plates 576 to one that best aligns with the user's desire navigation position of the viewing device.

In embodiments, in order to move the sliding carriage 180*a* out of the navigation position, the detent member 566 and the detent recess 574 have complementary shaped surfaces, such as ramped, inclined, or rounded surfaces, which allow the force of the detent spring 489 to be overcome when the release button 484 is depressed by manually exerting a sliding force on the sliding carriage 180*a* which is greater than the threshold force required to create a wedging action between the detent member 566 and the detent recess 574 such that the force of the detent spring 489 is overcome and the detent member 566 is caused to move out of the detent recess 574. In alternative embodiments, other detent release mechanisms may be provided.

The sliding carriage 180*a* includes sliding carriage laterally extending flanges or tabs 502 extending from opposing sides of the sliding carriage 180*a*. These flanges 502 engage with track lateral grooves 504 to hold the sliding carriage subassembly 128*a* in slidable relation to the track 500.

Figure 19A:
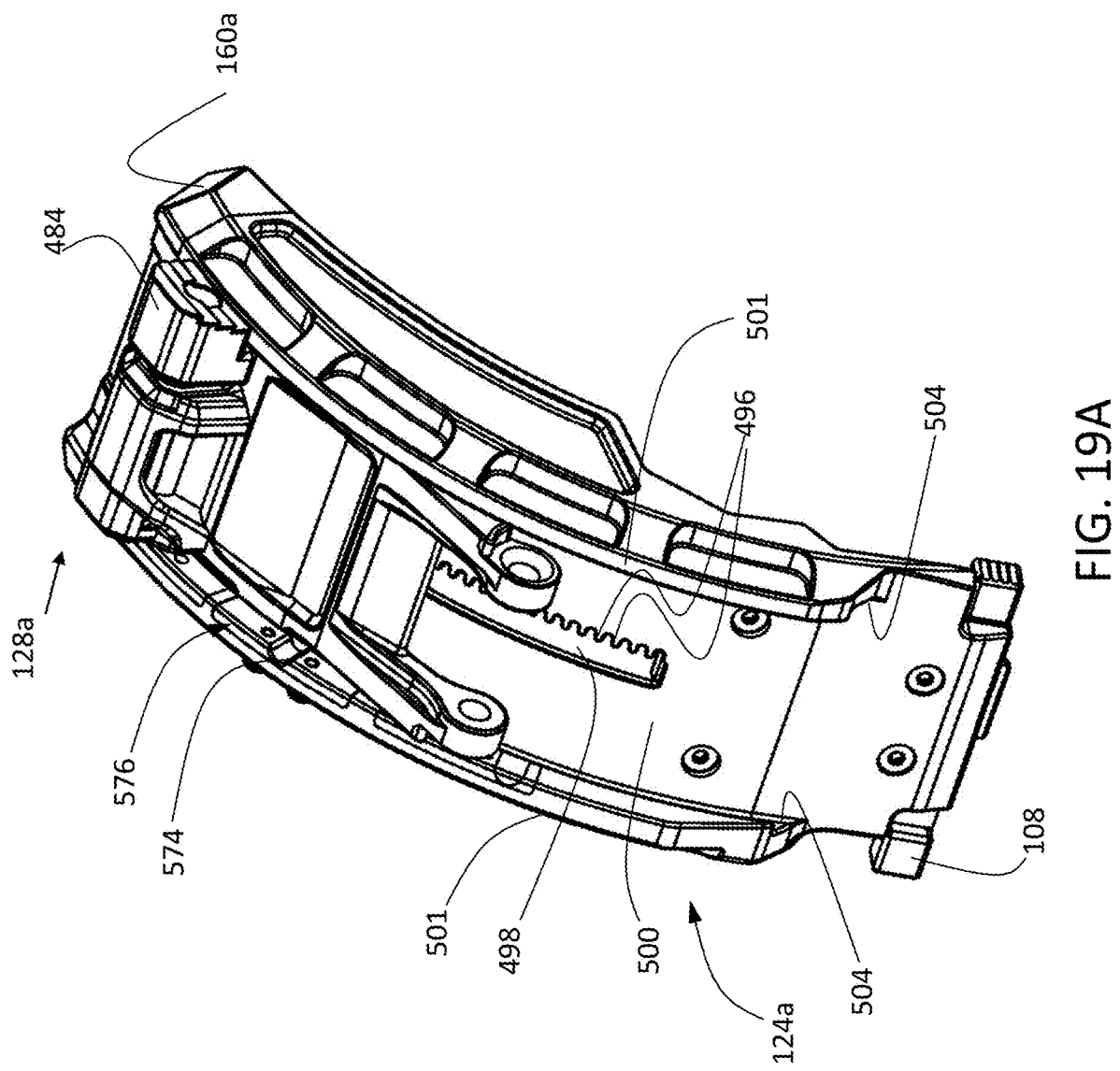
FIG. 19A is an isometric view of certain features of the helmet mount apparatus in isolation.
Figure 19B:
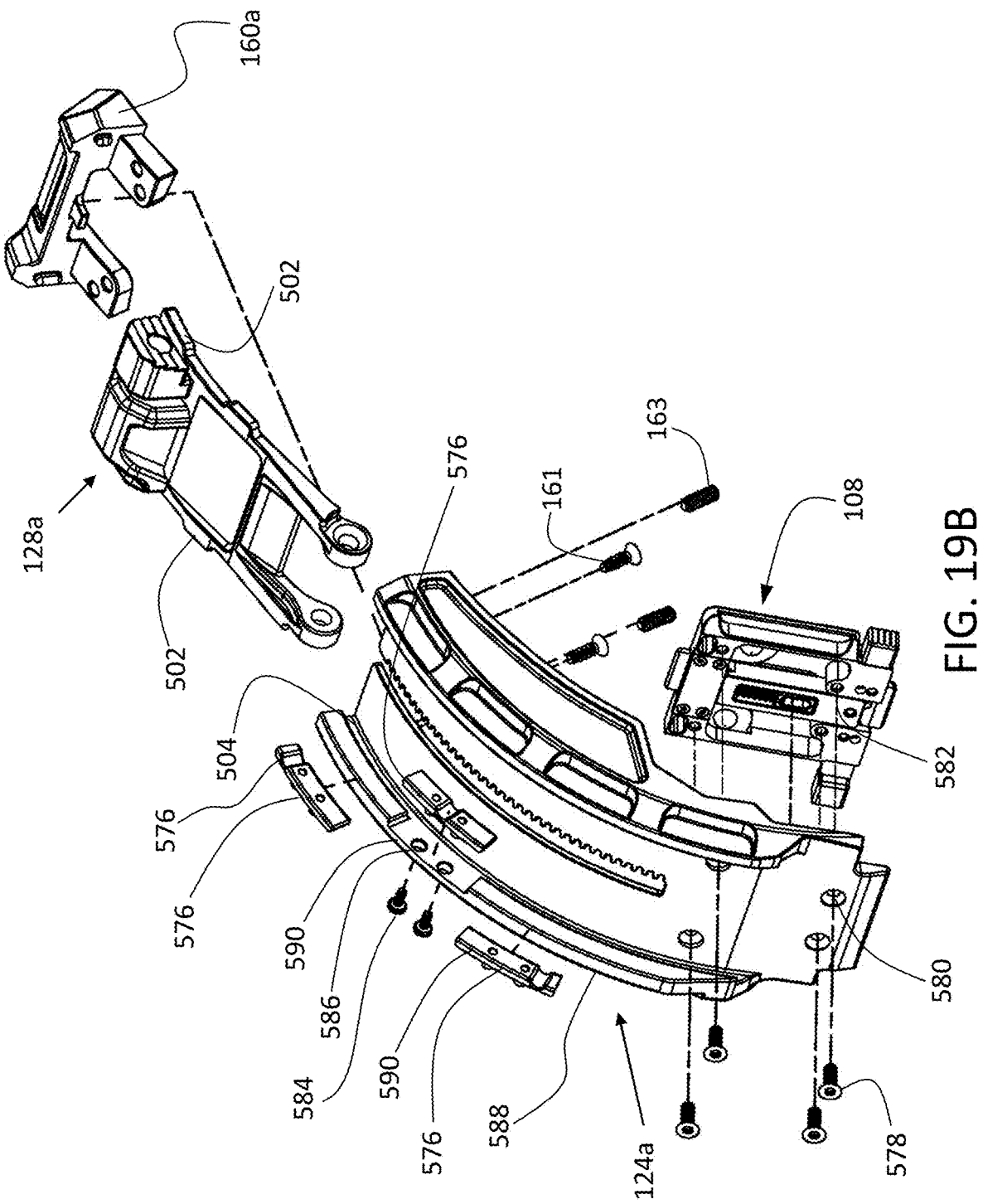
FIG. 19B is an exploded view of the features of the helmet mount apparatus in isolation of FIG. 19A.

Now referring to FIGS. 19A and 19B, isometric views of the engagement of the track subassembly 124*a* and the sliding carriage subassembly 128*a* are provided. The shroud interface assembly 108, which is as described above with reference to the first embodiment of the helmet mount assembly 100, and particularly with reference to FIGS. 7A and 7B, is shown where it is disposed between the track subassembly 124*a* and a front shroud of the helmet 104. The track subassembly 124*a* is secured to the shroud interface assembly 108 with threaded fasteners 578 passing through clearance openings 580 and threadably engaging aligned openings 582 in the shroud interface assembly 108.

The track subassembly 124*a* includes a track 500 bounded on opposing sides by axially extending upstanding walls 501, each with axially-extending grooves 504 formed therein and extending along the length of the track 500. the track 500 includes an elongate opening 498 and an axially extending series of track teeth 496 extending on a side of the elongate opening 498. The teeth 496 are configured to engage with the notched slide lock 486 of the sliding carriage subassembly 128*a*. The sliding carriage lateral flanges 502 fit within the lateral grooves 504 to hold the sliding plate carriage assembly 128*a* in slidable relation to the track 500.

The track subassembly 124*a* includes a track stop 160*a* (secured to the track by threaded fasteners 161 and set screws 163 which act as dowels) to halt the upward movement of the sliding carriage subassembly 128*a*. It is understood that when the track 500 is closed at both ends, the track stop 160*a* may be omitted. In operation, depression of the slide lock release button 484 translates the slide lock member 486 in a lateral direction such that the teeth 490 which interlock with the teeth 496 become disengaged from the track teeth 496, allowing the slide lock member 486 to travel within the elongate opening 498 as the sliding carriage 180*a* is moved up or down along the length of the track opening 498, directly adjacent to the track teeth 496. Upon release of the slide lock release button 484, the carriage locking teeth 490 of the notched slide lock 486 mechanically engage with the track teeth 496 at the desired position and the notched slide lock 486 is held there by the urging of the carriage spring 488. In embodiments, the track notches or teeth 490 are spaced in 0.100 inch intervals. In embodiments, the track length is 3 inches to provide 30 different user-selectable positions along the track. In embodiments, the teeth extend over an arc in the range of about 40 to 50 degrees, preferably 48.5 degrees.

As best seen in FIG. 19B, detent plate fasteners 584 pass through clearance openings 586 in a notched portion 590 of the upstanding track sidewall 588 to engage a desired one of a plurality of detent recess plates 576 which carry a recess detent 574. Three detent recess plates 576 are depicted although other numbers are contemplated. Each plate 576 has the recess 574 disposed at a different position. The detent is configured to engage the detent 566 as the sliding carriage 180a slides therepast to allow the user to quickly locate the desired navigation position wherein the attached viewing devices is above the line of sight of the user, but still in the uses field of view when looking up. In the illustrated embodiment, three detent recess plates 576 are shown wherein the detent recess 574 wherein a first detent recess plate has a detent recess disposed at a generally center position on the detent recess plate, a second detent recess plate has a detent recess disposed at a raised position on the detent recess plate (e.g., about 10 degrees) above the detent recess on the first detent recess plate, and a third detent recess plate has a detent recess disposed at a raised position on the detent recess plate (e.g., about 10 degrees) below the detent recess on the first detent recess plate.

Figure 20A:
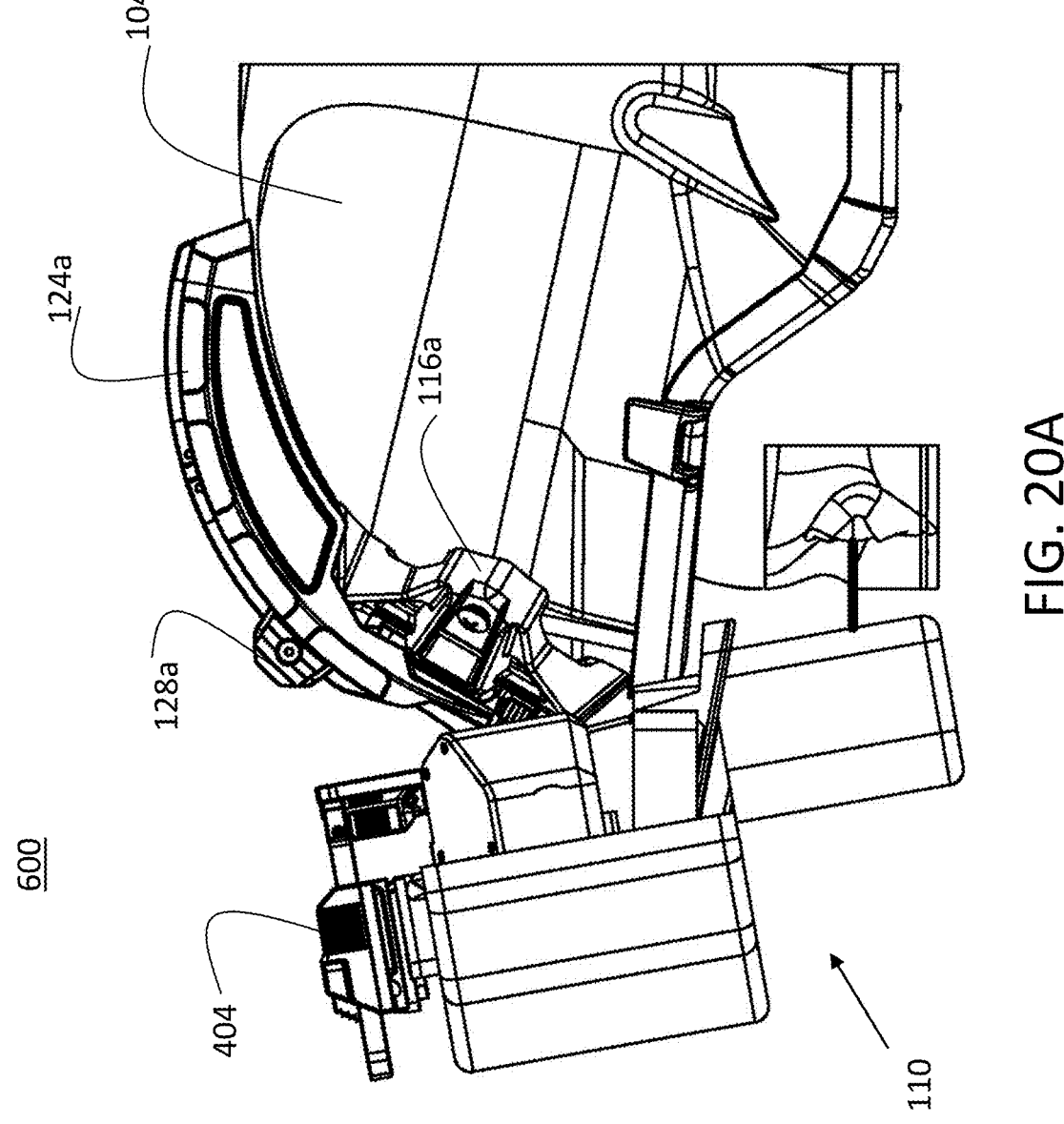
FIG. 20A is a side view of the helmet mount apparatus with a viewing device in a deployed position.
Figure 20B:
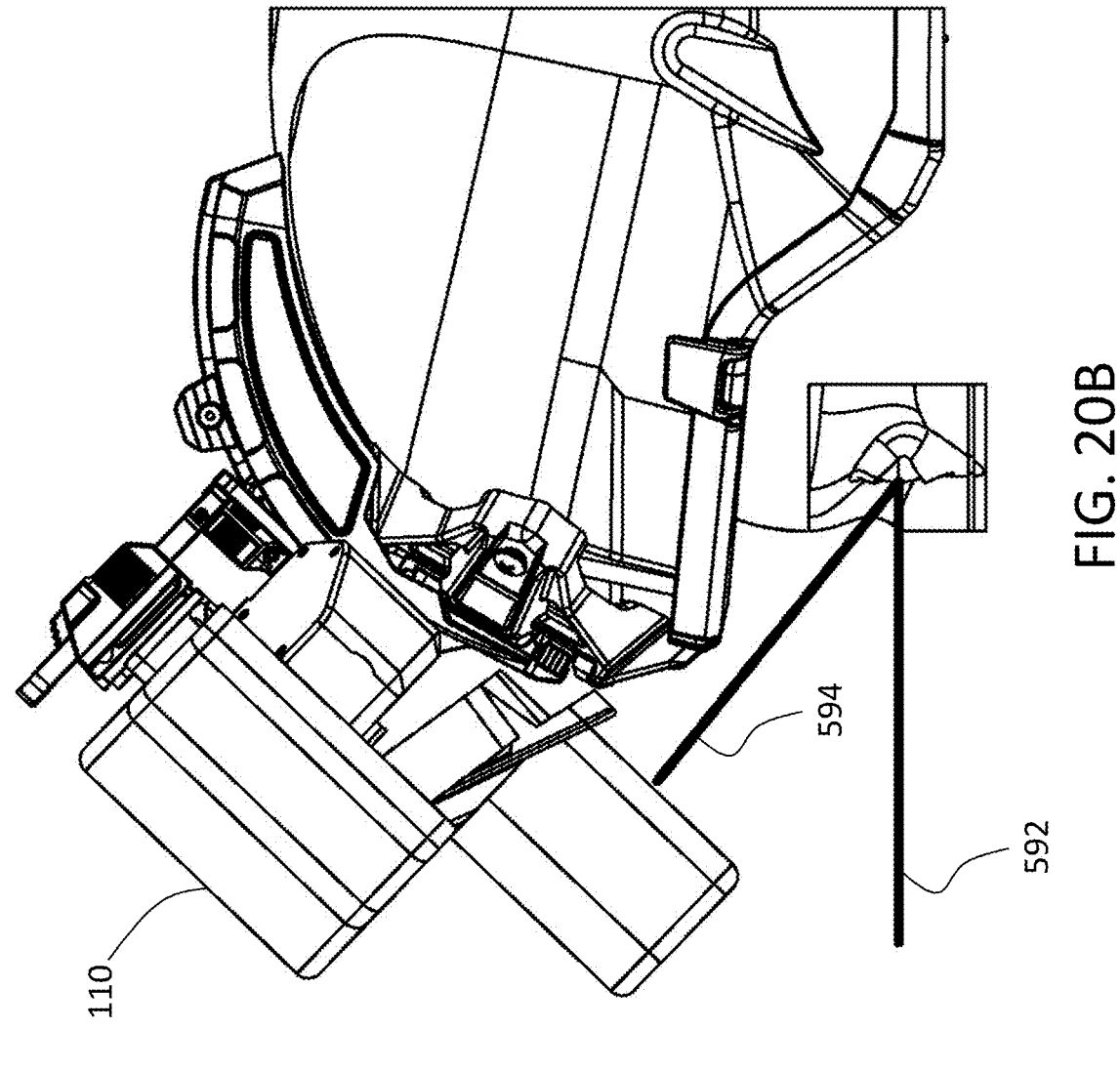
FIG. 20B is a side view of the helmet mount apparatus with a viewing device in an intermediate position between the deployed position shown in FIG. 20A and the stowed position shown in FIG. 20C.
Figure 20C:
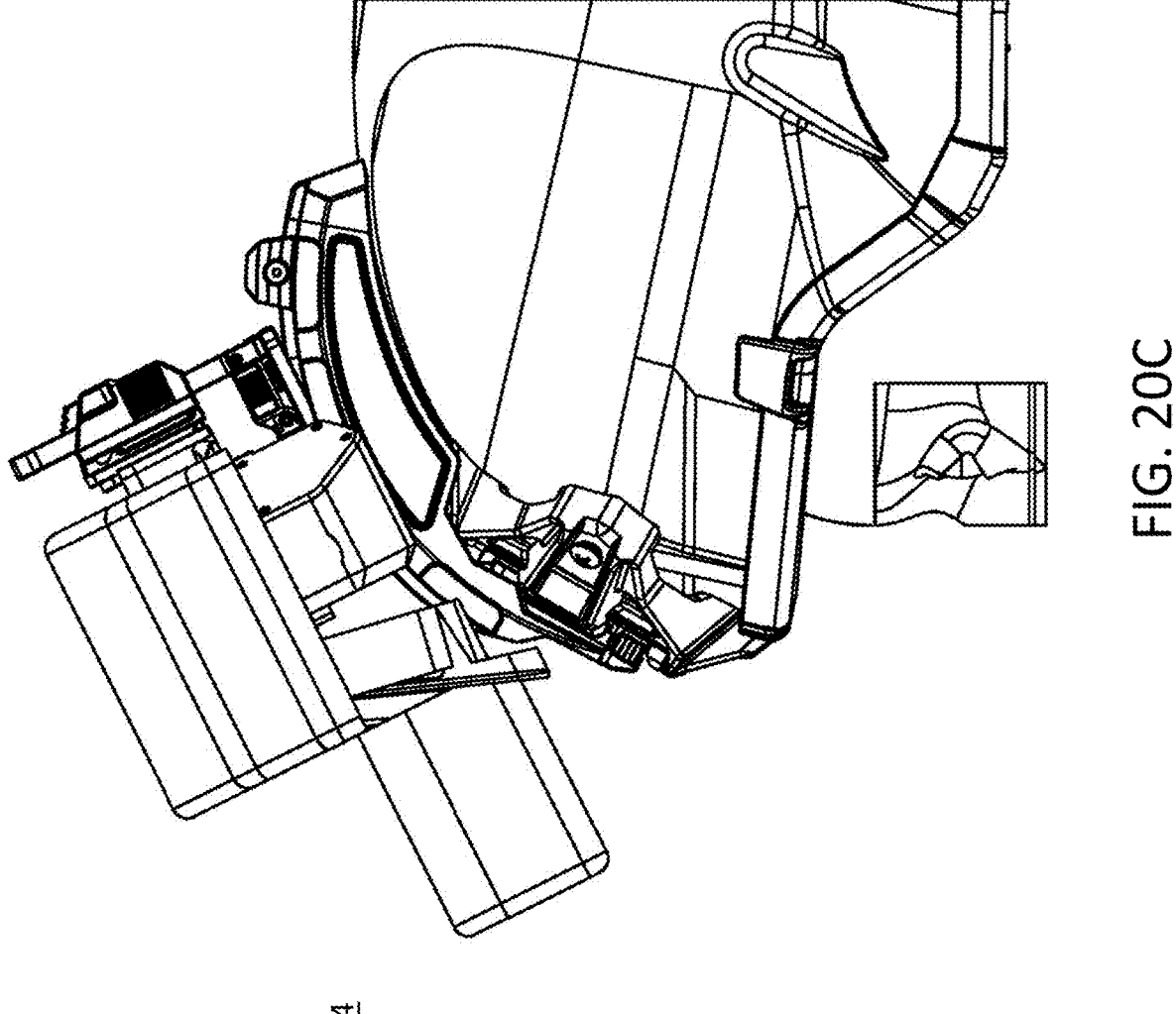
FIG. 20C is a side view of the helmet mount apparatus with a viewing device in a stowed position.

Now referring to FIGS. 20A-20C, in this manner, a user may easily move the sliding carriage subassembly 128a between a deployed position 600, as shown in FIG. 20A, where the viewing device 110 is in front of the viewer's eyes; a stowed position 604, as shown in FIG. 20C, where the viewing device 110 is above the viewer's eyes on the helmet 104; and an intermediate position 602, as shown in FIG. 20B, where the viewing device 110 is at an intermediate position between the stowed 604 and deployed 600 positions. The intermediate position 602 shown in FIG. 20B is an exemplary "navigation" position where it is above a line of sight 592 of the user when looking generally straight ahead, but is within the user field of vision when they shift their gaze upwardly along an elevated viewing direction 594 so that they may visually reference indicia displayed on the viewing device 110 without the viewing device 110 substantially obstructing the user's forward visual field. The stowed position 604 is particularly advantageous when the viewing device 110 is not in use and serves to reduce neck strain by moving the viewing device 110 back and toward the helmet's center of gravity.

Now referring to FIGS. 21A and 21B, isometric views of certain features of the helmet mount assembly 100a in isolation are provided. The axial sliding assembly 404, to which the viewing device 110 is attached, as described above with reference to FIGS. 15A-16B, is rigidly attached to the vertical adjustment subassembly 130a via the threaded fasteners 506 extending through the vertical adjustment connection points 508 of the axial sliding assembly 404 and through the axial sliding assembly connection points 478 of the vertical adjustment subassembly 130a. In addition, the axial sliding assembly 404 is further secured via the transverse pins 507 openings 509 in the arms 408 and engaging an aligned opening on the vertical slide assembly 464. A tilting pivot joint, depicted generally as reference number 268a, is defined by the outer hinge knuckles 272a which is coaxial with an inner hinge knuckle 276a, having a pivot rod 270 passing therethrough. Tensioning washers 280a are received within respective counterbores 596 in the outer hinge knuckles 272a. A threaded cap 282a engages a threaded end 286a of the rod 270. The cap 282 is tightened to provide a constantly tensioned pivot joint between the vertical adjustment subassembly 130a and the main carriage assembly 128a. Because the axial sliding assembly 404 is rigidly attached to the vertical positioning carriage 424, the user is able to adjust the viewing device 110 to a desired angle by manually pivoting the viewing device about the pivot joint 268a. In embodiments, the tension afforded by tensioning washers 280a and threaded cap 282a provides enough resistance to hold the viewing device 110 in place once the user releases it, but not so much as to prevent intentional manual repositioning by the user.

The invention has been described with reference to the preferred embodiment. Modifications and alterations will occur to others upon a reading and understanding of the preceding detailed description. It is intended that the invention be construed as including all such modifications and alterations insofar as they come within the scope of the appended claims or the equivalents thereof.

What is claimed is:

1. A helmet mount apparatus for adjusting a position of a viewing device on a helmet, said helmet mount apparatus comprising:
   a track assembly removably attachable to the helmet, the track assembly comprising a curved track having a shape corresponding to an exterior contour of a helmet shell and configured to extend along the exterior surface of the helmet shell;
   a main carriage assembly slidably attached to and slidably movable along said track assembly between a deployed position, wherein the viewing device is generally aligned with a user's line of sight when worn by the user, and a stowed position, wherein the viewing device is positioned above the user's line of sight when worn by the user;
   a vertical adjustment assembly pivotally coupled to the main carriage assembly; and
   an axial sliding assembly coupled to the vertical adjustment assembly, wherein the vertical adjustment subassembly is configured to detachably couple to the viewing device.

2. The helmet mount apparatus of claim 1, wherein the viewing device is a head up display.

3. The helmet mount apparatus of claim 1, wherein said vertical adjustment assembly comprises:
   a pivot plate pivotally coupled to a sliding carriage member of the main carriage assembly;
   a gear rack affixed to said pivot plate, said gear rack comprising a plurality of teeth;
   a vertical adjustment slide carriage slidably coupled to the gear rack, the vertical adjustment slide carriage including a slide lock configured to selectively engage with the gear rack at a plurality of positions to prevent sliding movement of the vertical adjustment slide carriage with respect to the gear rack; and
   a release member coupled to the slide lock and manually actuatable to disengage the slide lock from the plurality of teeth to permit sliding movement of the vertical adjustment slide carriage with respect to the gear rack.

4. The helmet mount apparatus of claim 3, wherein the axial sliding assembly comprises:
   a slide rail member having a proximal end secured to the vertical adjustment slide carriage assembly; and
   an axial slide carriage slidably coupled to the slide rail member and configured to detachably couple to the viewing device, the axial slide carriage slidable in an axial direction along the slide rail member for adjusting a distance between the viewing device and a user's eyes.

5. The helmet mount apparatus of claim 1, further comprising:
   said main carriage assembly comprising a sliding carriage slidably engaging the track assembly;

a main slide lock assembly disposed on the sliding carriage;

the main slide lock assembly including a slide lock member disposed within a slide lock housing, the slide lock member passing through an opening in the sliding carriage and extending into an axially-extending elongate opening formed in a base of the track assembly; and the elongate opening having an axially extending series of track teeth, the slide lock member configured to releasably engage with said track teeth to prevent sliding movement of the sliding carriage with respect to the track assembly.

6. The helmet mount apparatus of claim 5, further comprising:

a slide lock release button carried on the main slide lock assembly, the slide lock release button coupled to the slide lock member, wherein the slide lock release button is manually actuatable to move the slide lock member out of engagement with the track teeth.

7. The helmet mount apparatus of claim 6, further comprising:

the track base bounded on opposing sides by axially-extending sidewalls; and a resilient detent member coupled to the slide lock release button and configured to engage a complementary detent recess formed on a first one of the sidewalls when (a) the slide lock release button is manually actuated, and (b) the resilient detent member is moved into axial alignment with the detent recess, the detent recess thereby defining a preferential stopping position of the sliding carriage.

8. The helmet mount apparatus of claim 7, wherein the resilient detent member is moved into engagement with said first one of the sidewalls when the slide lock release button is manually actuated and moved out of engagement with said first one of the sidewalls when the slide lock release button is not manually actuated.

9. The helmet mount apparatus of claim 7, wherein the resilient detent member is configured to disengage from the detent recess upon application of a threshold force to thereby enable positional adjustment of the sliding carriage along the track assembly.

10. The helmet mount apparatus of claim 7, wherein the first one of the sidewalls includes a notch configured to receive a detent plate having the detent recess formed thereon.

11. The helmet mount apparatus of claim 10, wherein the notch is configured to receive a plurality of detent plates, wherein each of the interchangeable detent plates has a detent recess formed at a different axial position, and further wherein the detent plates are interchangeable to allow customization of the preferential stopping position.

12. The helmet mount apparatus of claim 5, wherein the track base is bounded on opposing sides by axially-extending sidewalls, wherein each of the axially-extending sidewalls comprises an axially-extending channel formed therein, and wherein the sliding carriage comprises one or more pairs of tabs extending outward from opposing sides thereof and each tab of said one or more pairs of tabs slidably received within one of the axially-extending channels.

13. The helmet mount apparatus of claim 1, wherein the axial sliding assembly comprises:

a slide rail member having a proximal end secured to the vertical adjustment assembly;

an axial slide carriage slidably coupled to the slide rail member and configured to detachably couple to the viewing device, the axial slide carriage slidable in an axial direction along the slide rail member for adjusting a distance between the viewing device and a user's eyes.

14. The helmet mount apparatus of claim 1, wherein the axial sliding assembly comprises:

a mounting shoe interface plate disposed on a first side of the slide rail member and defining a mounting shoe receptacle configured to detachably couple to a mounting shoe on the viewing device;

a housing disposed on a second side of the slide rail member and coupled to the mounting shoe interface plate;

one or more manually actuatable slide release buttons having one or more locking teeth configured to interlock with an axially-extending series of teeth disposed on the slide rail member to secure the axial sliding assembly in a fixed axial position with respect to the slide rail member, wherein the one or more manually actuatable slide release buttons are configured to move the one or more locking teeth out of engagement with the axially-extending series of teeth to permit axial sliding movement of the axial sliding assembly with respect to the slide rail member;

a pivoting lock lever pivotally secured to the axial sliding assembly and including a latch member extending through an opening in the mounting shoe interface plate and configured to engage with a complementary opening in the mounting shoe when the viewing device is coupled to the axial sliding assembly;

a spring member coupled to the latch member and configured to pivot the pivoting lock lever in a first direction wherein the latch member is urged onto engagement with the complementary opening in the mounting shoe; and a lock lever release button mechanically coupled to the pivoting lock lever and configured to pivot the pivot the pivoting lock lever in a second direction opposite the first direction to move the latch member onto engagement with the complementary opening in the mounting shoe.

15. The helmet mount apparatus of claim 1, further comprising:

the main carriage assembly comprising a sliding carriage having a sliding plate and first and second arms extending from a lower end of the sliding plate, each of the first and second arms including an aligned opening positioned along a pivot axis;

the vertical adjustment assembly comprising a pivot plate having a pivot cylinder disposed at a lower end of the pivot plate, the pivot cylinder disposed between the first and second arms, the pivot cylinder including a bore aligned with the pivot axis; and a pivot rod passing through the aligned holes of the first and second arms and the bore of the pivot cylinder, wherein the pivot rod rotatably couples the sliding carriage to the pivot plate, thereby facilitating pivoting movement between the main carriage assembly and the vertical adjustment assembly.

16. The helmet mount apparatus of claim 1, further comprising one or more tensioning members configured to create adjustable resistance to the pivoting movement.

17. The helmet mount apparatus of claim 1, further comprising a shroud interface assembly coupled to the track assembly, the shroud interface assembly configured to mechanically couple to a shroud on the helmet.

18. A helmet mount apparatus for adjusting a position of a viewing device on a helmet, said helmet mount apparatus comprising:

a track assembly removably attachable to the helmet;

a main carriage assembly slidably attached to and movable along said track assembly between a deployed position, wherein the viewing device is generally aligned with a user's line of sight when worn by the user, and a stowed position, wherein the viewing device is positioned above the user's line of sight when worn by the user;

a vertical adjustment assembly pivotally coupled to the main carriage assembly;

an axial sliding assembly coupled to the vertical adjustment assembly, wherein the vertical adjustment subassembly is configured to detachably couple to the viewing device;

said main carriage assembly comprising a sliding carriage slidably engaging the track assembly;

a main slide lock assembly disposed on the sliding carriage;

the main slide lock assembly including a slide lock member disposed within a slide lock housing, the slide lock member passing through an opening in the sliding carriage and extending into an axially-extending elongate opening formed in a base of the track assembly;

the elongate opening having an axially extending series of track teeth, the slide lock member configured to releasably engage with said track teeth to prevent sliding movement of the sliding carriage with respect to the track assembly;

a slide lock release button carried on the main slide lock assembly, the slide lock release button coupled to the slide lock member, wherein the slide lock release button is manually actuatable to move the slide lock member out of engagement with the track teeth;

the track base bounded on opposing sides by axially-extending sidewalls; and a resilient detent member coupled to the slide lock release button and configured to engage a complementary detent recess formed on a first one of the sidewalls when (a) the slide lock release button is manually actuated, and (b) the resilient detent member is moved into axial alignment with the detent recess, the detent recess thereby defining a preferential stopping position of the sliding carriage;

wherein the first one of the sidewalls includes a notch configured to receive a detent plate having the detent recess formed thereon; and wherein the notch is configured to receive a plurality of detent plates, wherein each of the interchangeable detent plates has a detent recess formed at a different axial position, and further wherein the detent plates are interchangeable to allow customization of the preferential stopping position.

19. A helmet mount apparatus for adjusting a position of a viewing device on a helmet, said helmet mount apparatus comprising:

a track assembly removably attachable to the helmet;

a main carriage assembly slidably attached to and movable along said track assembly between a deployed position, wherein the viewing device is generally aligned with a user's line of sight when worn by the user, and a stowed position, wherein the viewing device is positioned above the user's line of sight when worn by the user;

a vertical adjustment assembly pivotally coupled to the main carriage assembly; and an axial sliding assembly coupled to the vertical adjustment assembly, wherein the vertical adjustment subassembly is configured to detachably couple to the viewing device;

wherein the axial sliding assembly comprises:

a mounting shoe interface plate disposed on a first side of the slide rail member and defining a mounting shoe receptacle configured to detachably couple to a mounting shoe on the viewing device;

a housing disposed on a second side of the slide rail member and coupled to the mounting shoe interface plate;

one or more manually actuatable slide release buttons having one or more locking teeth configured to interlock with an axially-extending series of teeth disposed on the slide rail member to secure the axial sliding assembly in a fixed axial position with respect to the slide rail member, wherein the one or more manually actuatable slide release buttons are configured to move the one or more locking teeth out of engagement with the axially-extending series of teeth to permit axial sliding movement of the axial sliding assembly with respect to the slide rail member;

a pivoting lock lever pivotally secured to the axial sliding assembly and including a latch member extending through an opening in the mounting shoe interface plate and configured to engage with a complementary opening in the mounting shoe when the viewing device is coupled to the axial sliding assembly;

a spring member coupled to the latch member and configured to pivot the pivoting lock lever in a first direction wherein the latch member is urged onto engagement with the complementary opening in the mounting shoe; and a lock lever release button mechanically coupled to the pivoting lock lever and configured to pivot the pivot the pivoting lock lever in a second direction opposite the first direction to move the latch member onto engagement with the complementary opening in the mounting shoe.

*   *   *   *   *